United States Patent
Si et al.

(10) Patent No.: US 11,019,588 B2
(45) Date of Patent: May 25, 2021

(54) METHOD AND APPARATUS FOR ADVANCED FREQUENCY OFFSET INDICATION

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/562,332

(22) Filed: Sep. 5, 2019

(65) Prior Publication Data

US 2020/0084739 A1    Mar. 12, 2020

Related U.S. Application Data

(60) Provisional application No. 62/729,718, filed on Sep. 11, 2018, provisional application No. 62/843,667, (Continued)

(51) Int. Cl.
*H04W 56/00* (2009.01)
*H04W 72/00* (2009.01)
*H04L 5/00* (2006.01)
*H04W 16/14* (2009.01)
*H04W 72/04* (2009.01)

(52) U.S. Cl.
CPC ....... *H04W 56/0015* (2013.01); *H04L 5/0094* (2013.01); *H04W 16/14* (2013.01); *H04W 72/005* (2013.01); *H04W 72/0453* (2013.01)

(58) Field of Classification Search
CPC .......... H04W 56/0015; H04W 72/005; H04W 16/14; H04W 72/0453; H04L 5/0094; H04L 27/2666; H04L 27/2675; H04L 27/261; H04L 27/2602; H04L 5/0091;
(Continued)

(56) References Cited

U.S. PATENT DOCUMENTS

2017/0006458 A1    1/2017   Wang et al.
2017/0094624 A1    3/2017   Balachandran et al.
(Continued)

OTHER PUBLICATIONS

3GPP TSG RAN WG1 Meeting #90bis Prague, Czech Republic Oct. 9-13, 2017 R1-171461 (Year: 2017).*
(Continued)

*Primary Examiner* — Dady Chery

(57) ABSTRACT

A method of a user equipment (UE) in a wireless communication system is provided. The method comprises receiving, from a base station (BS), a synchronization signal and physical broadcast channel block (SS/PBCH block) over a downlink channel of an unlicensed band; identifying a frequency location selected from a set of synchronization raster entries for receiving the SS/PBCH block, wherein the frequency location is aligned with a center resource element (RE) of the SS/PBCH block; determining a first RE in a first lowest frequency domain location of the SS/PBCH block based on the identified frequency location; and determining a second RE in a second lowest frequency domain location of a control resource set #0 (CORESET #0) that includes a fixed frequency offset between the first RE of the SS/PBCH block and the second RE of the CORESET #0.

18 Claims, 19 Drawing Sheets

Related U.S. Application Data filed on May 6, 2019, provisional application No. 62/854,568, filed on May 30, 2019.

(58) Field of Classification Search
CPC ... H04L 5/0048; H04L 5/0053; H04L 5/0064; H04L 5/0035; H04L 5/0023; H04J 11/0069

See application file for complete search history.

(56) References Cited

U.S. PATENT DOCUMENTS

| | | | |
|---|---|---|---|
| 2018/0084593 A1 | 3/2018 | Chen et al. | |
| 2018/0337755 A1* | 11/2018 | John Wilson | H04J 11/0076 |
| 2020/0053670 A1* | 2/2020 | Jung | H04W 56/0015 |

OTHER PUBLICATIONS

3GPP TSG RAN WG1 Meeting #90bis Prague, Czech Republic Oct. 9-13, 2017 R1-171050 (Year: 2017).*

"5G; NR; Physical channels and modulation (3GPP TS 38.211 version 15.2.0 Release 15)", ETSI TS 138 211 V15.2.0, Jul. 2018, 98 pages.

"5G; NR; Multiplexing and channel coding (3GPP TS 38.212 version 15.2.0 Release 15)", ETSI TS 138 212 V15.2.0, Jul. 2018, 101 pages.

"5G; NR; Physical layer procedures for control (3GPP TS 38.213 version 15.2.0 Release 15)", ETSI TS 138 213 V15.2.0, Jul. 2018, 101 pages.

"5G; NR; Physical layer procedures for data (3GPP TS 38.214 version 15.2.0 Release 15)", ETSI TS 138 214 V15.2.0, Jul. 2018, 95 pages.

"5G; NR; Physical layer measurements (3GPP TS 38.215 version 15.2.0 Release 15)", ETSI TS 138 215 V15.2.0, Jul. 2018, 18 pages.

"3rd Generation Partnership Project, Technical Specification Group Radio Access Network; NR; Radio Resource Control (RRC) protocol specification (Release 15)", 3GPP TS 38.331 V15.1.0, Jun. 2018, 304 pages.

"5G; NR; Medium Access Control (MAC) protocol specification (3GPP TS 38321 version 15.2.0 Release 15)", ETSI TS 138 321 V15.2.0, Sep. 2018, 74 pages.

ISA/KR, International Search Report and Written Opinion of the International Searching Authority, International Application No. PCT/KR2019/011855, dated Dec. 20, 2019, 9 pages.

Mediatek Inc, "n41 sync raster entries," R4-1810207, 3GPP TSG-RAN WG4 Meeting #88, Gothenburg, Sweden, Aug. 20-24, 2018, 3 pages.

Oppo, "SS/PBCH block transmission on NR-U," R1-1806856, 3GPP TSG RAN WG1 Meeting #93, Busan, Korea, May 21-25, 2018, 2 pages.

* cited by examiner

METHOD AND APPARATUS FOR ADVANCED FREQUENCY OFFSET INDICATION

CROSS-REFERENCE TO RELATED APPLICATIONS AND CLAIM OF PRIORITY

The present application claims priority to: U.S. Provisional Patent Application Ser. No. 62/729,718, filed on Sep. 11, 2018; U.S. Provisional Patent Application Ser. No. 62/843,667, filed on May 6, 2019; and U.S. Provisional Patent Application Ser. No. 62/854,568, filed on May 30, 2019. The content of the above-identified patent document is incorporated herein by reference.

TECHNICAL FIELD

The present application relates generally to wireless communication systems, more specifically, this disclosure relates to advanced frequency offset indication.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for supporting advanced frequency offset indication in an advanced communication system.

In one embodiment, a user equipment (UE) in a wireless communication system is provided. The UE comprises a transceiver configured to receive, from a base station (BS), a synchronization signal and physical broadcast channel block (SS/PBCH block) over a downlink channel of an unlicensed band. The UE further comprises at least one processor operably connected to the transceiver, the at least one processor configured to identify a frequency location selected from a set of synchronization raster entries for receiving the SS/PBCH block, wherein the frequency location is aligned with a center resource element (RE) of the SS/PBCH block; determine a first RE in a first lowest frequency domain location of the SS/PBCH block based on the identified frequency location; and determine a second RE in a second lowest frequency domain location of a control resource set #0 (CORESET #0) that includes a fixed frequency offset between the first RE of the SS/PBCH block and the second RE of the CORESET #0.

In another embodiment, a base station (BS) in a wireless communication system is provided. The BS comprises at least one processor configured to identify a frequency location selected from a set of synchronization raster entries for transmitting a synchronization signal and physical broadcast channel block (SS/PBCH block), wherein the frequency location is aligned with a center resource element (RE) of the SS/PBCH block; identify a first RE in a first lowest frequency domain location of the SS/PBCH block based on the identified frequency location; and identify a second RE in a second lowest frequency domain location of a control resource set #0 (CORESET #0) that includes a fixed frequency offset between the first RE of the SS/PBCH block and the second RE of the CORESET #0. The BS further comprises a transceiver operably connected to the at least on processor, the transceiver configured to transmit, to a user equipment (UE), the SS/PBCH block over a downlink channel of an unlicensed band.

In yet another embodiment, a method of a user equipment (UE) in a wireless communication system is provided. The method comprises receiving, from a base station (BS), a synchronization signal and physical broadcast channel block (SS/PBCH block) over a downlink channel of an unlicensed band; identifying a frequency location selected from a set of synchronization raster entries for receiving the SS/PBCH block, wherein the frequency location is aligned with a center resource element (RE) of the SS/PBCH block; determining a first RE in a first lowest frequency domain location of the SS/PBCH block based on the identified frequency location; and determining a second RE in a second lowest frequency domain location of a control resource set #0 (CORESET #0) that includes a fixed frequency offset between the first RE of the SS/PBCH block and the second RE of the CORESET #0.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.2.0, "NR; Physical channels and modulation;" 3GPP TS 38.212 v15.2.0, "NR; Multiplexing and Channel coding;" 3GPP TS 38.213 v15.2.0, "NR; Physical Layer Procedures for Control;" 3GPP TS 38.214 v15.2.0, "NR; Physical Layer Procedures for Data;" 3GPP TS 38.215 v15.2.0, "NR; Physical Layer Measurements;" 3GPP TS 38.321 v15.2.0, "NR; Medium Access Control (MAC) protocol specification;" and 3GPP TS 38.331 v15.2.0, "NR; Radio Resource Control (RRC) Protocol Specification."

Figure 1:
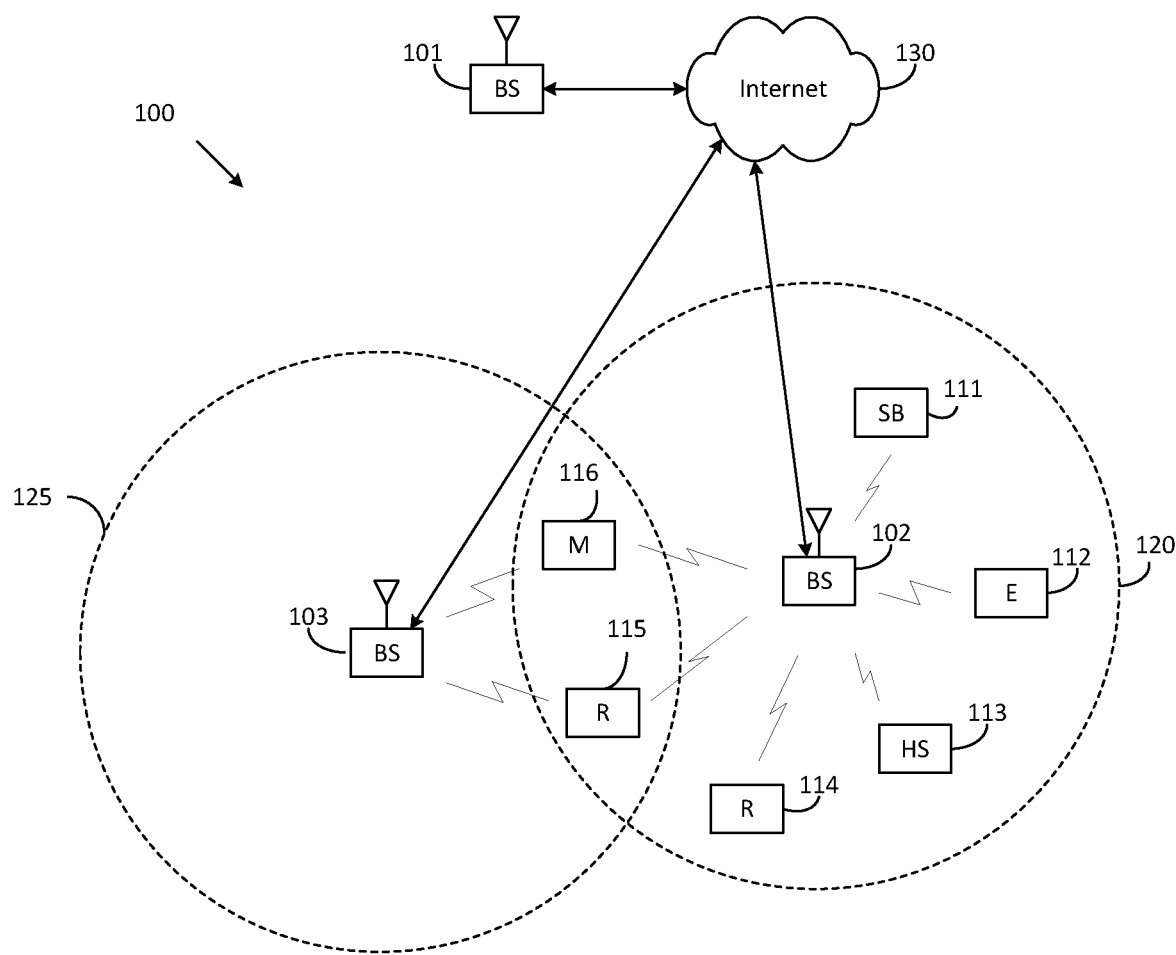
FIG. 1 illustrates an example wireless network according to embodiments of the present disclosure.
Figure 2:
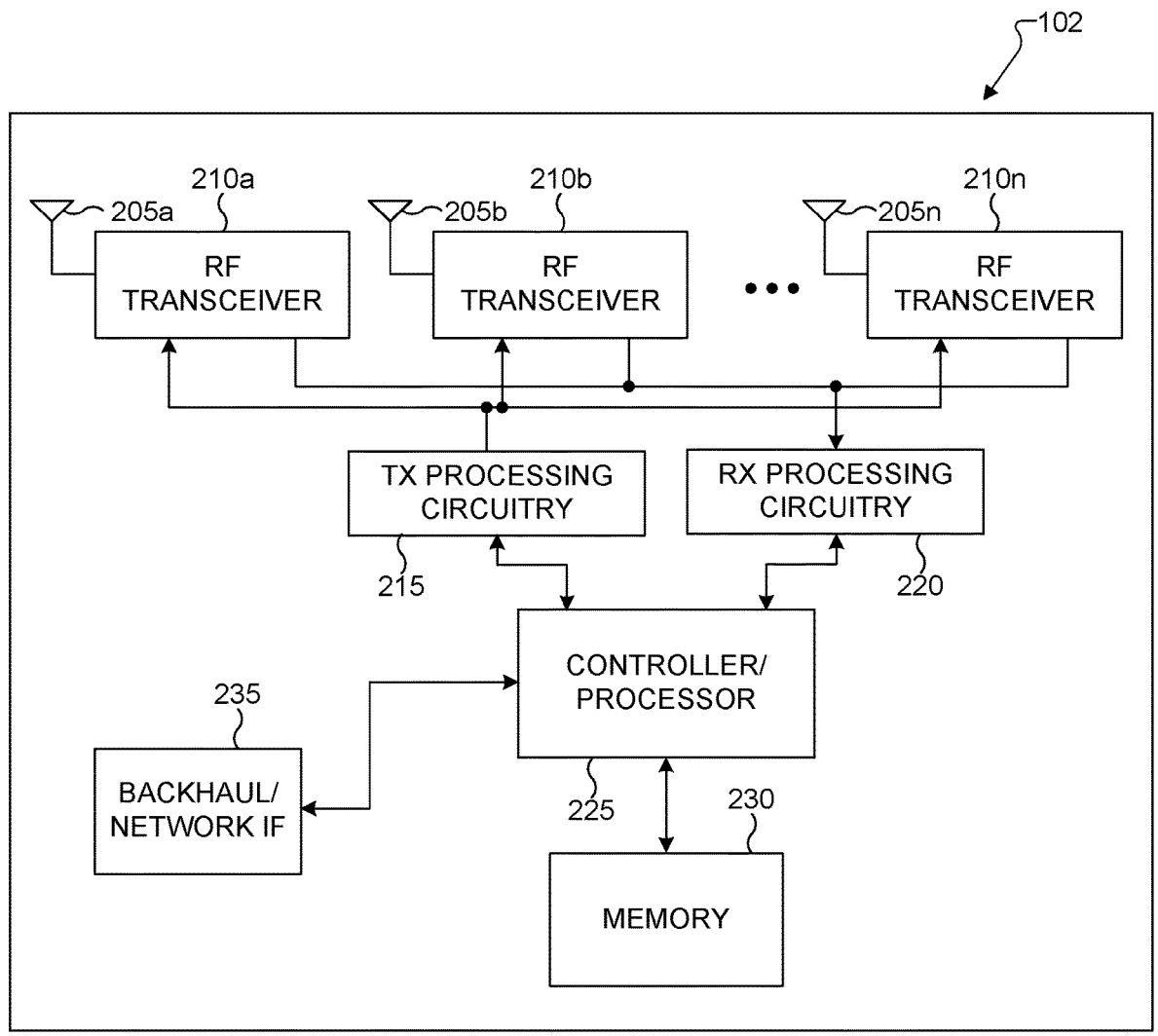
FIG. 2 illustrates an example gNB according to embodiments of the present disclosure.
Figure 3:
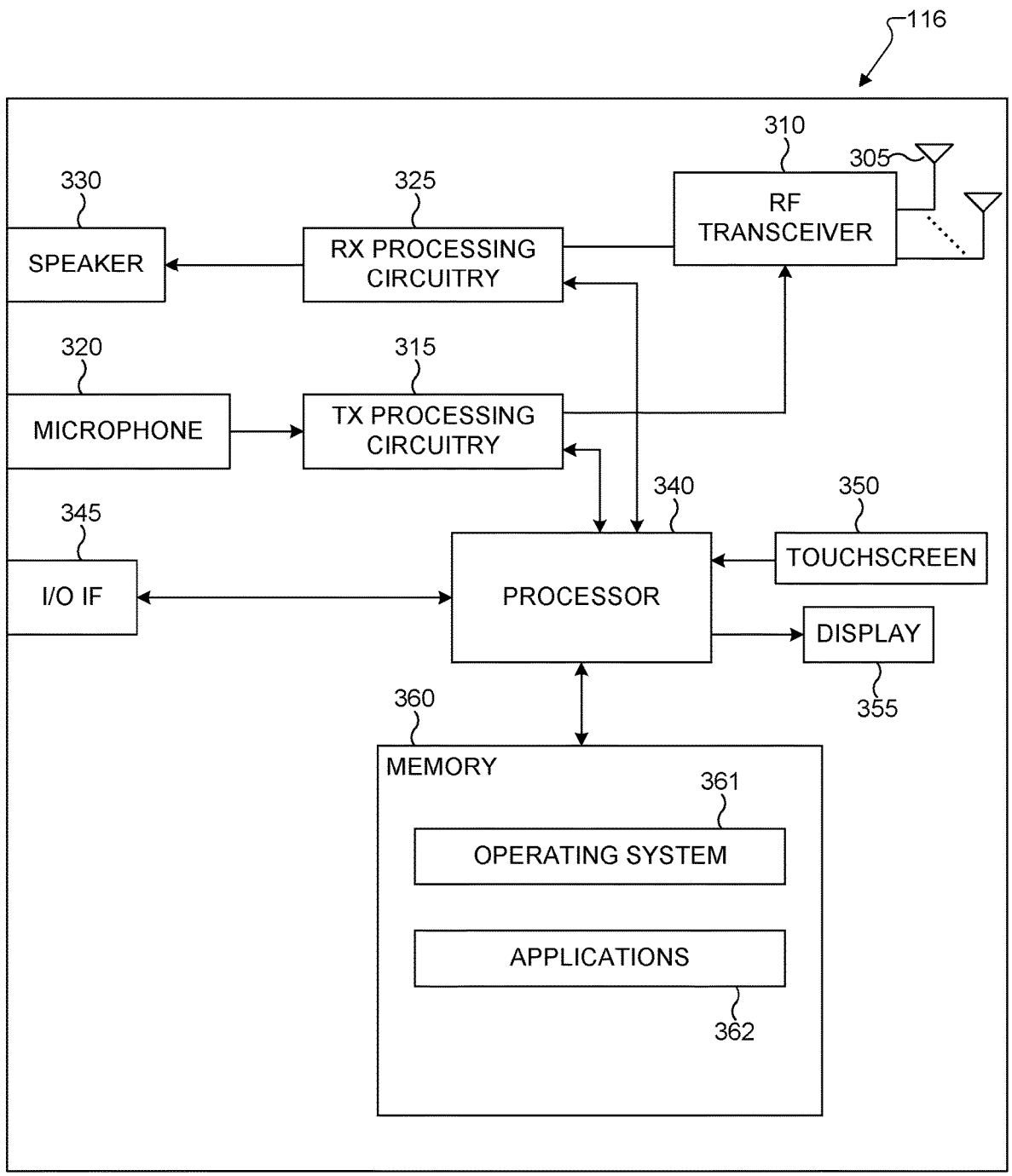
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient frequency offset indication in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT preceding that is known as DFT-spread-OFDM.

Figure 4:
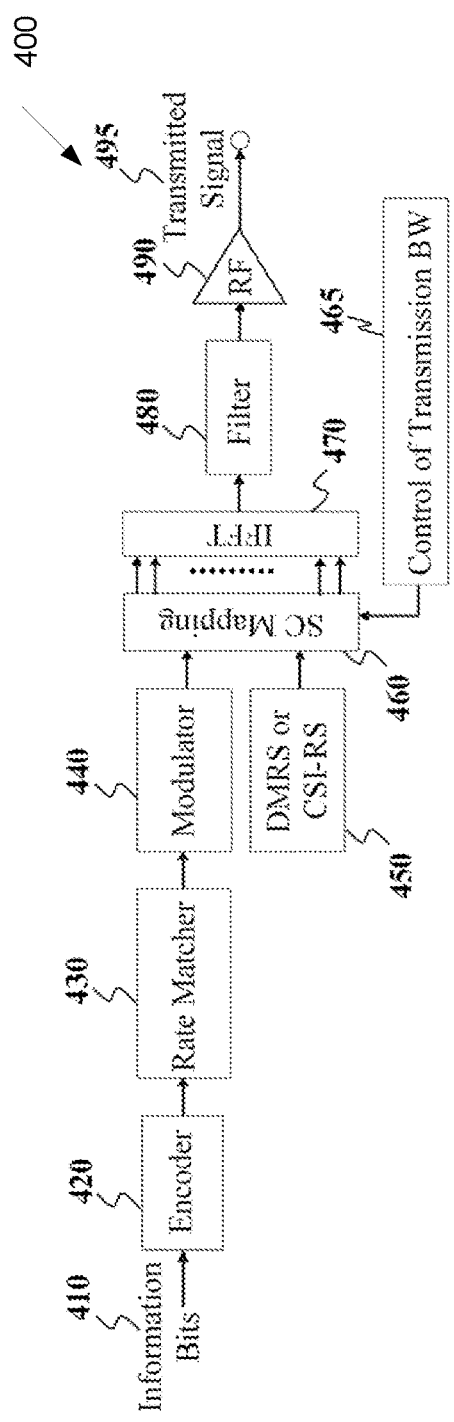
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by an radio frequency (RF) unit 495.

Figure 5:
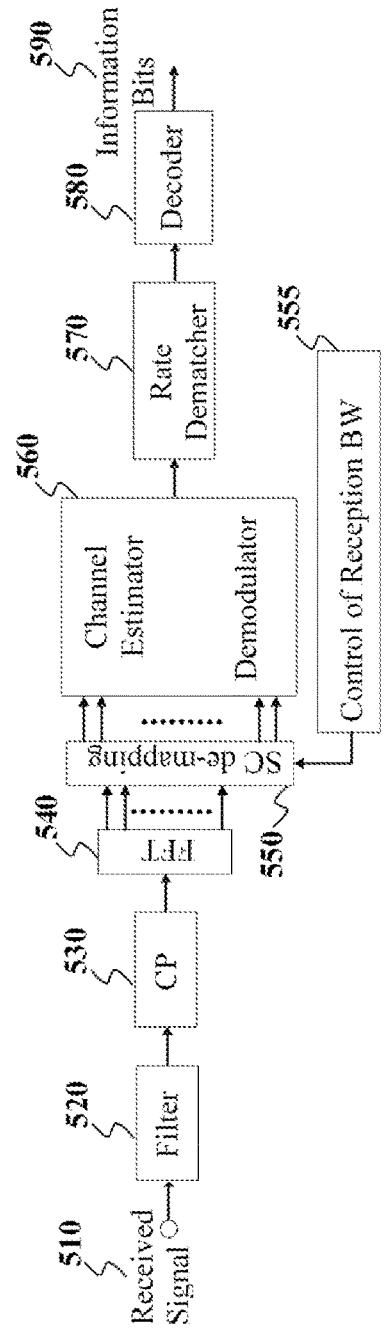
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
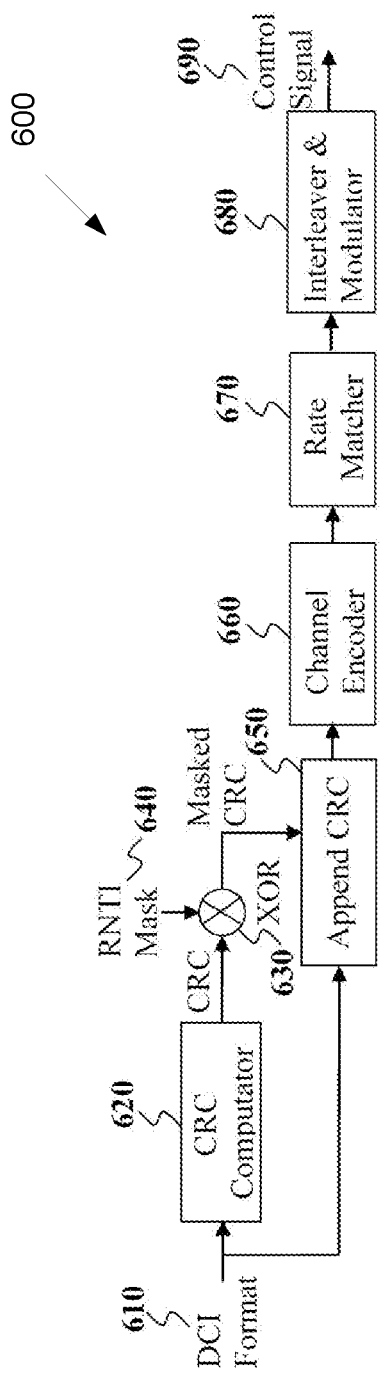
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR(0,0)=0, XOR(0,1)=1, XOR(1,0)=1, XOR(1,1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
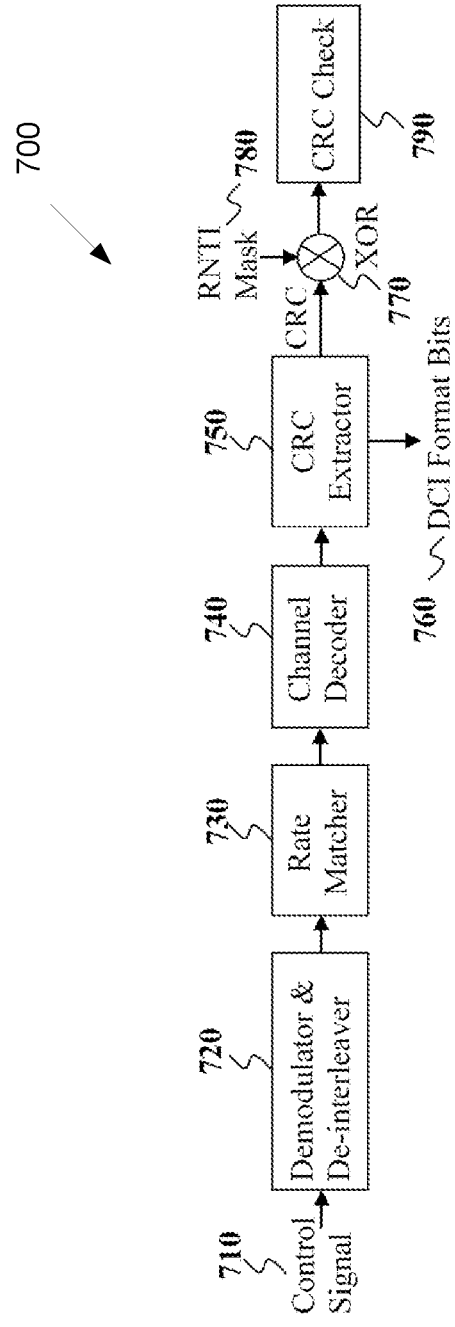
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (check-sum is zero), the DCI format information bits are considered to be valid. When the CRC check does not succeed, the DCI format information bits are considered to be invalid.

Unlike LTE, NR supports flexible frequency allocation of synchronization signals/physical broadcast channel blocks (SS/PBCH block or SSB) and the control resource set (CORESET) for monitoring physical downlink control channel (PDCCH) scheduling the transmission of common control information such as remaining system information (RMSI), and the indication of the frequency offset between the lowest resource element (RE) of SS/PBCH block and the lowest RE of CORESET for RMSI is contained by payload carried by the PBCH in the corresponding SS/PBCH block.

The determination of the frequency offset is based on an assumption that channel raster is determined as small, and a channel can be located at any channel raster from a network perspective. On the other hand, a cell-defining SS/PBCH block is located on a predefined synchronization raster, wherein the interval between synchronization raster is much larger than a channel raster. The synchronization raster is understood as the frequency location aligned with the center RE of SS/PBCH block, and the channel raster is understood as the frequency location aligned with the center RE of a channel.

Figure 8:
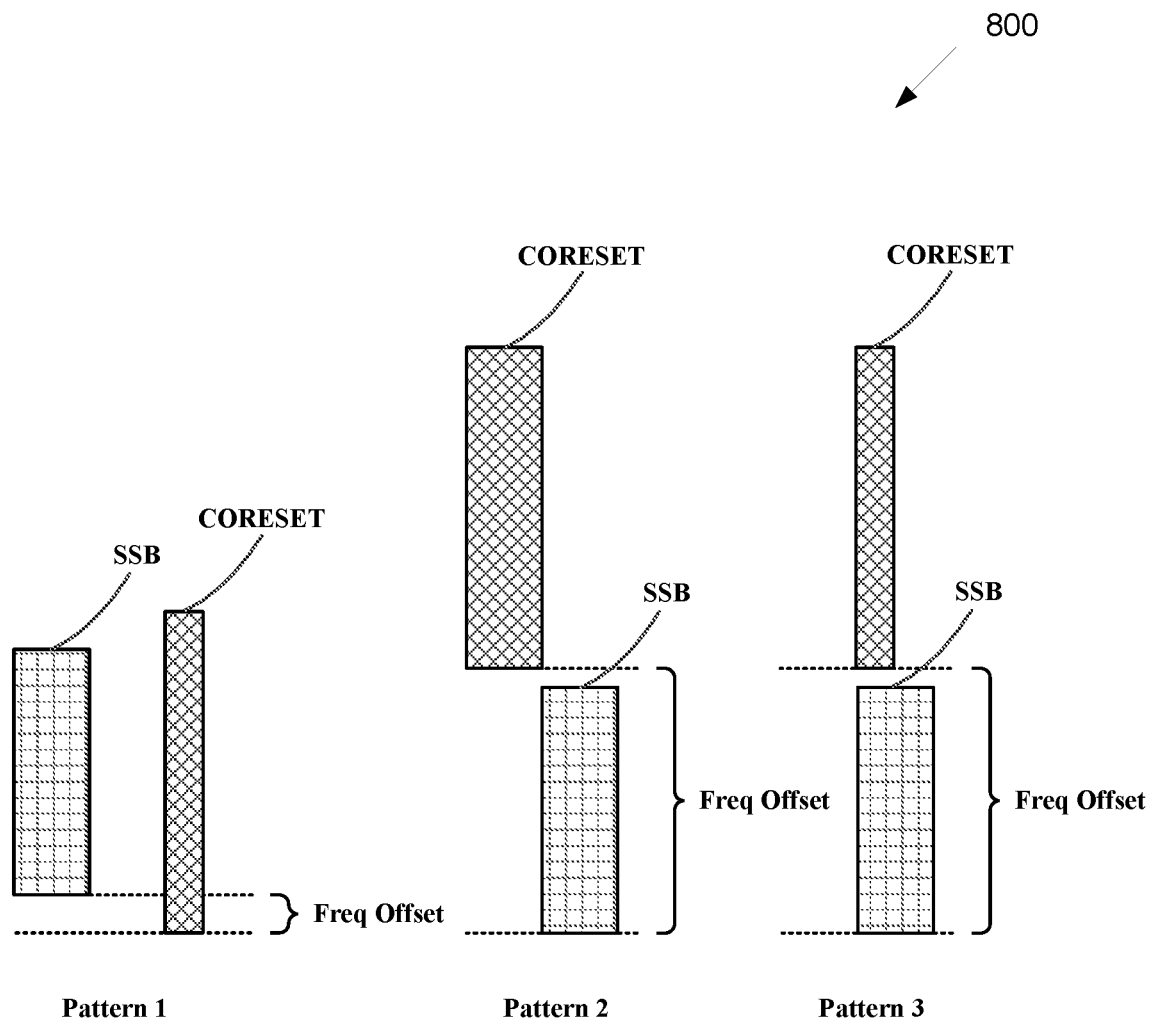
FIG. 8 illustrates an example multiplexing pattern between SSB and CORESET according to embodiments of the present disclosure.

FIG. 8 illustrates an example multiplexing pattern 800 between SSB and CORESET according to embodiments of the present disclosure. An embodiment of the multiplexing pattern 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

The frequency offset can be represented by an RB level offset and an RE level offset, wherein the RB level offset is jointly coded with the multiplexing pattern of SS/PBCH block and CORESET for RMSI, the number of symbols for the CORESET for RMSI, and the bandwidth of the CORESET for RMSI, wherein the multiplexing pattern is as one of the predefined three patterns, as illustrates in FIG. 8, while the RE level offset is coded separately using another field.

Figure 9:
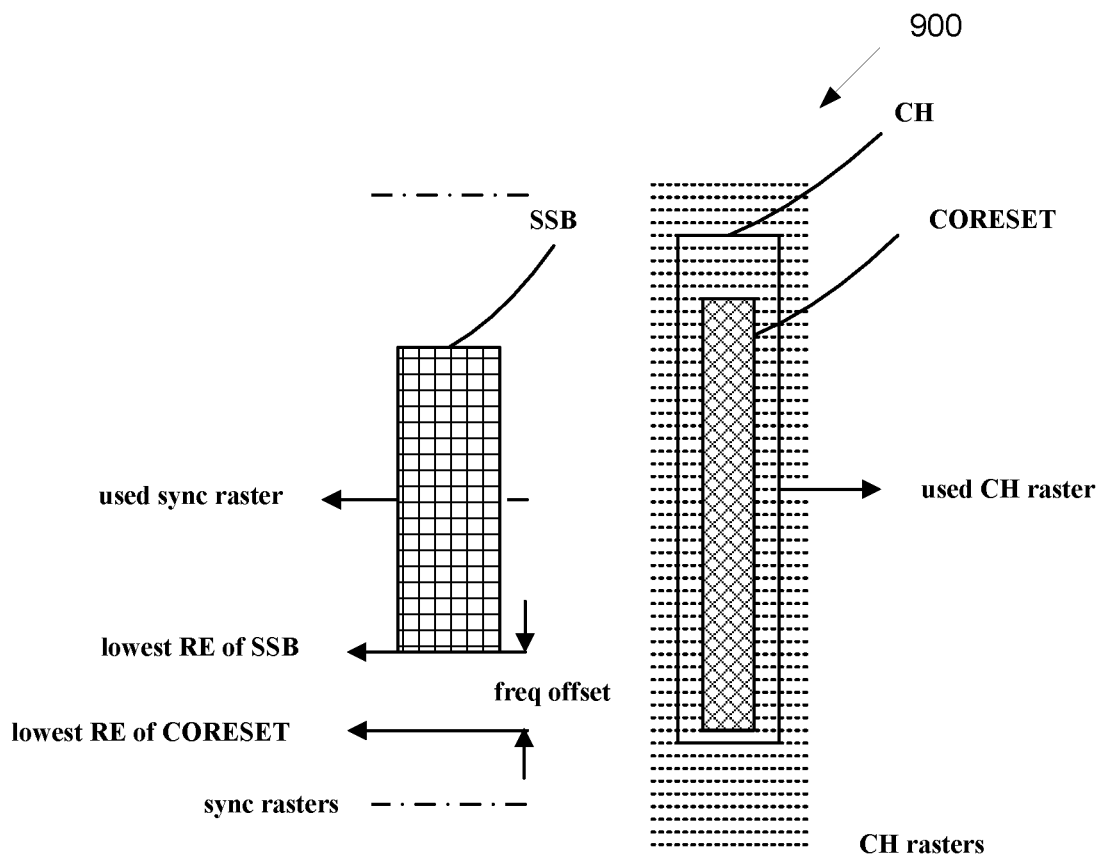
FIG. 9 illustrates an example determination for the frequency offset according to embodiments of the present disclosure.

FIG. 9 illustrates an example determination for the frequency offset 900 according to embodiments of the present disclosure. An embodiment of the frequency offset 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

An illustration of a method of determining the frequency offset between SSB and CORESET (such as for Pattern 1) is given in FIG. 9.

Figure 10:
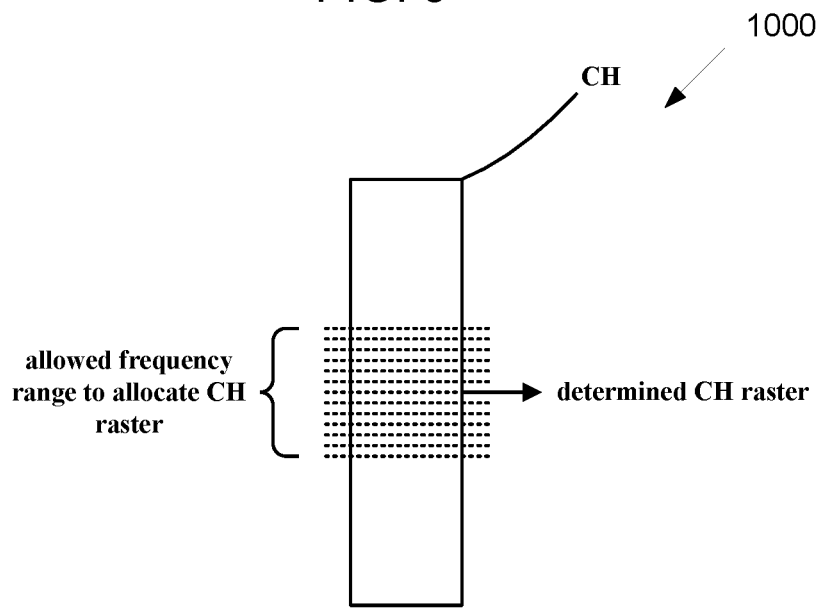
FIG. 10 illustrates an example channel with restricted range for channel rasters according to embodiments of the present disclosure.

FIG. 10 illustrates an example channel with restricted range for channel rasters 1000 according to embodiments of the present disclosure. An embodiment of the channel with restricted range for channel rasters 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In NR beyond, there can be a type of channels that are not as flexible as the ones defined in NR, such as given some restrictions on channel raster such that a channel may not be allocated arbitrarily in the frequency domain. For example, for a given band, the channel raster can be restricted to a small range in the frequency domain, as illustrated in FIG. 10.

This type of channels can be at least one of an unlicensed band, or a sidelink band, or a shared spectrum, wherein there exists regulation or existing radio access technology (RAT) giving limitations on the channelization.

For the bands with this type of channel raster design, it may be a waste of bits to reuse NR's indication methodology in determining the frequency offset between the SS/PBCH block and CORESET for RMSI, since the flexibility has been remarkably reduced. Saving configurations on the frequency offset indication can help with other necessary indication in the content of PBCH, such as to address exclusive features for those bands. Hence, there is a need to define a new indication method on the frequency offset for the bands with this type of channel raster design.

The present disclosure focuses on the advanced indication method of the frequency offset, targeting for saving bits comparing to the indication method in NR.

This present disclosure focuses on the advanced indication method of the frequency offset for a type of bands with channel raster restricted to a predefined small frequency range. For each of this type of bands, the channel raster can be chosen from a predefined set of values per band, such as denoted as $\{R\_0, R\_1, \ldots, R\_\{M-1\}\}$, where M is the size of predefined set.

In one example, the channel rasters are with uniform intervals, and one of the channel rasters can be selected as a reference, such as the predefined set of values can be denoted as $\{R\_ref-M\_1*\Delta R\_CH, \ldots, R\_ref, \ldots, R\_ref+M\_2*\Delta R\_CH\}$, where $\Delta R\_CH$ is the uniform interval, and R_ref is the reference channel raster, and $M\_1+M\_2+1=M$. In one sub-example, R_ref is selected such that the corresponding resource block grid of the channel is aligned with the resource block grid of the associated SS/PBCH block.

In one embodiment, a frequency offset is defined as the difference between lowest RE of the SS/PBCH block and the lowest RE of the CORESET #0 for common search space for monitoring a Type0-PDCCH (e.g., at least one of remaining minimum system information (RMSI), broadcast other system information (OSI), paging, or random access response (RAR)), and the CORESET #0 is confined within a channel bandwidth, wherein the channel is allocated on one of the restricted set of channel rasters.

In such embodiment, BW_CORESET is denoted as the bandwidth (BW) of CORESET #0, BW_SSB as the BW of SS/PBCH block, BW_CH is denoted as the BW of nominal channel containing CORESET #0, SCS_CORESET is denoted as the subcarrier spacing (SCS) of CORESET #0, and SCS_SSB is denoted as the SCS of SS/PBCH block.

In one example, combination of approaches and examples in this embodiment can be supported for a given band or a frequency range of a given band (e.g., a subset of the supported channels of a given band).

In one example, a frequency offset can be determined by an RB level frequency offset $\Delta F2$ and a RE level frequency offset $\Delta F1$, wherein the RB is expressed in the SCS of PDCCH monitored in CORESET #0, the RE are in a reference SCS, and an RE level frequency offset is defined to take a non-negative value.

In such example, each of the channel rasters supported for a nominal channel can be expressed as $R\_ref-\Delta$, wherein R_ref is a reference frequency location that the corresponding resource block grid of the channel located on R_ref is aligned with the resource block grid of SS/PBCH block located on a synchronization raster, and $\Delta \geq 0$. The set of all R_ref for the channel rasters supported for a nominal channel can be denoted as S_ref.

In one example of the reference SCS, there may be the lowest SCS supported for PDCCH monitored in CORESET #0 for a given band, and the RE level frequency offset can be one from $\{0, 1, \ldots, 12*R\_SCS\_CORESET-1\}$, where R_SCS_CORESET is the ratio between the largest SCS and the lowest SCS supported for PDCCH monitored in CORESET #0 for that given band.

In another example of the reference SCS, there may be the SCS of PDCCH monitored in CORESET #0 for a given band, and the RE level frequency offset can be one from $\{0, 1, \ldots, 11\}$. In one instance, if the SCS of SS/PBCH block is fixed as the same as the SCS of PDCCH monitored in CORESET #0, the RE level frequency offset can be one from $\{0, 1, \ldots, 11\}$.

Figure 11:
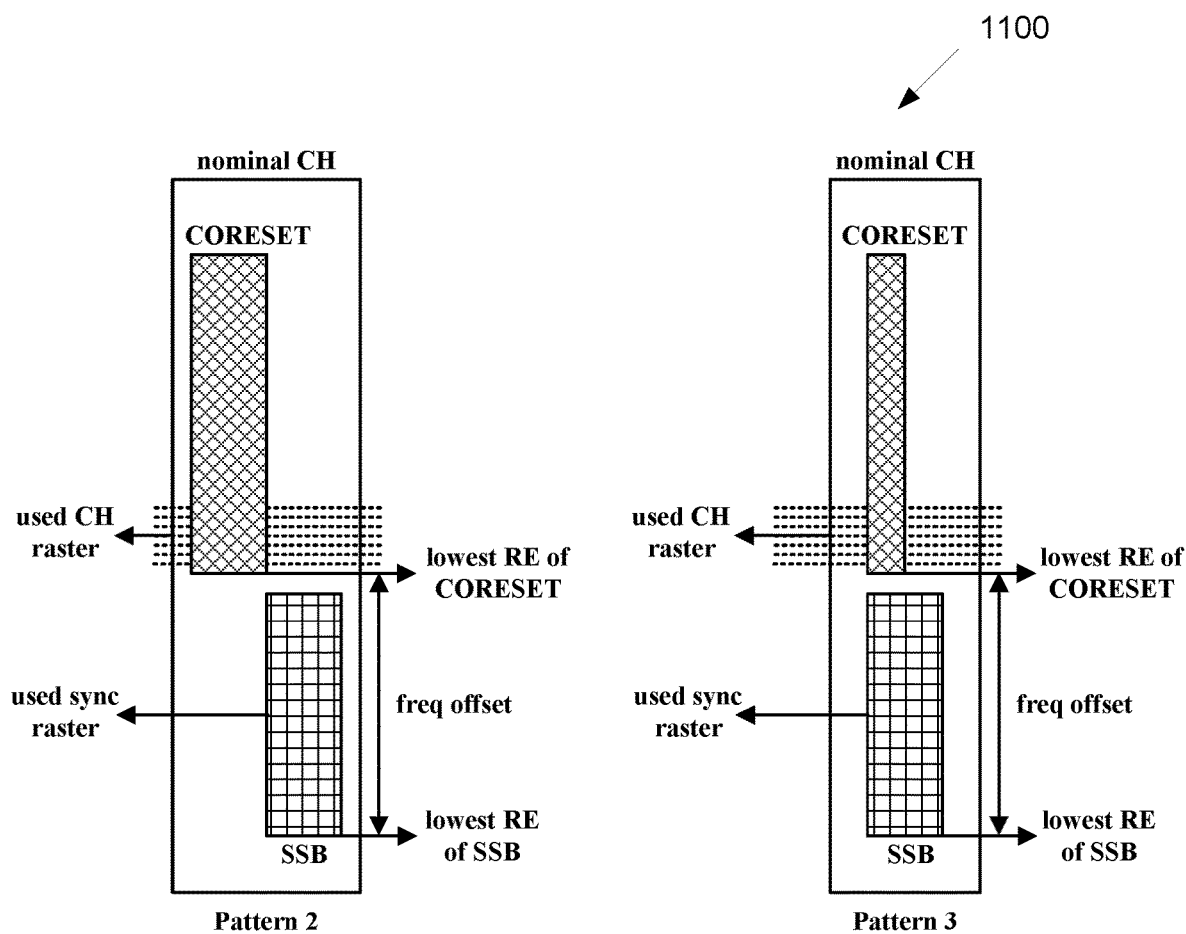
FIG. 11 illustrates an example frequency offset indication for Pattern 2 and Pattern 3 according to embodiments of the present disclosure.

FIG. 11 illustrates an example frequency offset indication 1100 for Pattern 2 and Pattern 3 according to embodiments of the present disclosure. An embodiment of the frequency offset indication 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In one example of the frequency offset indication for the pattern 2 or the pattern 3, the SS/PBCH block and associated CORESET #0 are both confined within a nominal channel (e.g., as illustrated in FIG. 11), such as 20 MHz for an unlicensed spectrum. The indication method is similar to NR operation, since the relative location of SS/PBCH block and the associated CORESET #0 can be configured as not related to the channel location in the pattern 2 or the pattern 3.

For instance, the RB level offset $\Delta F2$ is determined as one of: $\{BW\_CORESET, -BW\_SSB\}$ if the subcarrier offset $\Delta F1=0$ and SCS_SSB=SCS_RMSI in pattern 3; $\{BW\_CORESET, -BW\_SSB-1\}$ if the subcarrier offset $\Delta F1 \neq 0$ and SCS_SSB=SCS_RMSI in pattern 3; $\{BW\_CORESET+1, -BW\_SSB*SCS\_SSB/SCS\_RMSI-1\}$ if the subcarrier offset $\Delta F1=0$ and SCS_SSB$\neq$SCS_RMSI in pattern 2; or $\{BW\_CORESET+1, -BW\_SSB*SCS\_SSB/SCS\_RMSI-2\}$ if the subcarrier offset $\Delta F1 \neq 0$ and SCS_SSB$\neq$SCS_RMSI in pattern 2.

Figure 12:
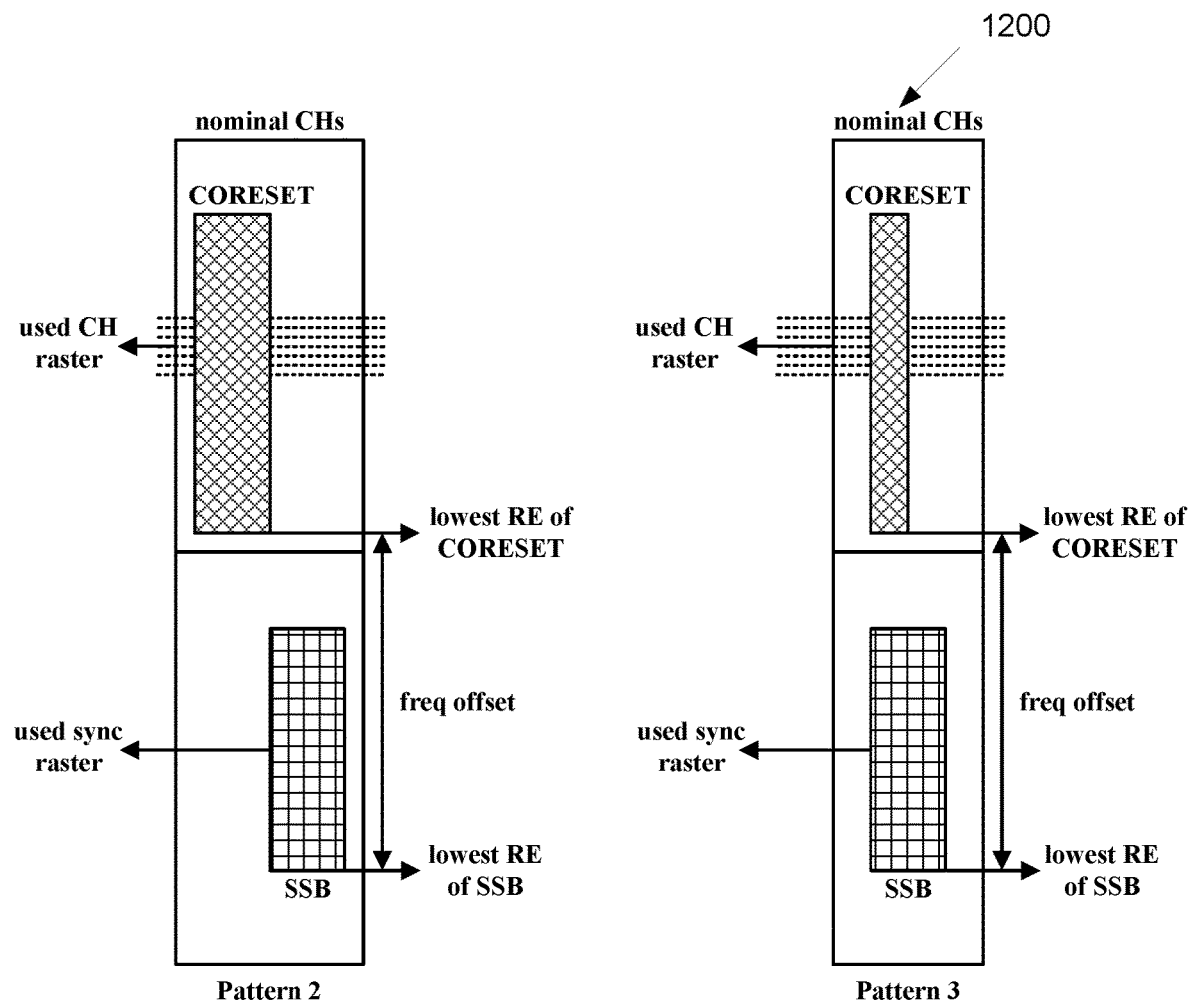
FIG. 12 illustrates another example frequency offset indication for Pattern 2 and Pattern 3 according to embodiments of the present disclosure.

FIG. 12 illustrates another example frequency offset indication 1200 for Pattern 2 and Pattern 3 according to embodiments of the present disclosure. An embodiment of the frequency offset indication 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In another example of the frequency offset indication for the pattern 2 or the pattern 3, each of the SS/PBCH block and associated CORESET #0 can be confined within a separate nominal channel (such as 20 MHz for an unlicensed spectrum), respectively, as illustrated in FIG. 12.

For one instance, if the number of RBs for the nominal channel containing CORESET #0 is even, the CORESET #0 can be configured as center-aligned with the nominal channel containing the CORESET, then the RB level offset $\Delta F2$ can be determined as one of: R_sync−R_ref1_CORESET+

BW_CORESET/2−BW_SSB*SCS_SSB/SCS_CORESET/2; or R_sync−R_ref2_CORESET+BW_CORESET/2−BW_SSB*SCS_SSB/SCS_CORESET/2, where R_sync is the used synchronization raster where the SS/PBCH block is located, R_ref1_CORESET is the used channel raster where the nominal channel containing CORESET #0 is located and corresponding RB grid is aligned with the SS/PBCH block located on the synchronization raster R_sync with condition R_ref1_CORESET<R_sync, and R_ref2_CORESET is the used channel raster where the nominal channel containing CORESET #0 is located and corresponding RB grid is aligned with the SS/PBCH block located on the synchronization raster R_sync with condition R_ref2_CORESET>R_sync.

In one instance, the CORESET #0 can be configured as aligned with an edge of the nominal channel containing the CORESET, wherein the edge is the closer one to the SS/PBCH block in the frequency (e.g., the lowest RE of the first RB of channel BW if CORESET #0 is multiplexed to a higher frequency range than the SS/PBCH block, or the highest RE of the last RB of channel BW if CORESET #0 is multiplexed to a lower frequency range than the SS/PBCH block), then the RB level offset ΔF2 can be determined as one of: R_sync−R_ref1_CORESET+BW_CH/2−BW_SSB*SCS_SSB/SCS_CORESET/2; or R_sync−R_ref2_CORESET+BW_CH/2−BW_SSB*SCS_SSB/SCS_CORESET/2, where R_sync is the used synchronization raster where the SS/PBCH block is located, R_ref1_CORESET is the used channel raster where the nominal channel containing CORESET #0 is located and corresponding RB grid is aligned with the SS/PBCH block located on the synchronization raster R_sync with condition R_ref1_CORESET<R_sync, and R_ref2_CORESET is the used channel raster where the nominal channel containing CORESET #0 is located and corresponding RB grid is aligned with the SS/PBCH block located on the synchronization raster R_sync with condition R_ref2_CORESET>R_sync.

In one instance, the CORESET #0 can be configured as 1 RB apart from an edge of the nominal channel containing the CORESET, wherein the edge is the closer one to the SS/PBCH block in the frequency (e.g., the lowest RE of the first RB of channel BW if CORESET #0 is multiplexed to a higher frequency range than the SS/PBCH block, or the highest RE of the last RB of channel BW if CORESET #0 is multiplexed to a lower frequency range than the SS/PBCH block), and the 1 RB can be reserved for floating sync, then the RB level offset ΔF2 can be determined as one of: R_sync−R_ref1_CORESET+BW_CH/2−BW_SSB*SCS_SSB/SCS_CORESET/2+1; or R_sync−R_ref2_CORESET+BW_CH/2−BW_SSB*SCS_SSB/SCS_CORESET/2−1, where R_sync is the used synchronization raster where the SS/PBCH block is located, R_ref1_CORESET is the used channel raster where the nominal channel containing CORESET #0 is located and corresponding RB grid is aligned with the SS/PBCH block located on the synchronization raster R_sync with condition R_ref1_CORESET<R_sync, and R_ref2_CORESET is the used channel raster where the nominal channel containing CORESET #0 is located and corresponding RB grid is aligned with the SS/PBCH block located on the synchronization raster R_sync with condition R_ref2_CORESET>R_sync.

In one example of the frequency offset indication for the pattern 1, the SS/PBCH block and associated CORESET #0 can be both confined within a nominal CH, and the SS/PBCH block can locate on a common synchronization raster such that the SS/PBSCH block is confined within the BW of nominal CH wherein the nominal CH can be located at any channel rasters supported. Note that if there is only one supported channel raster, this example always applies.

Figure 13:
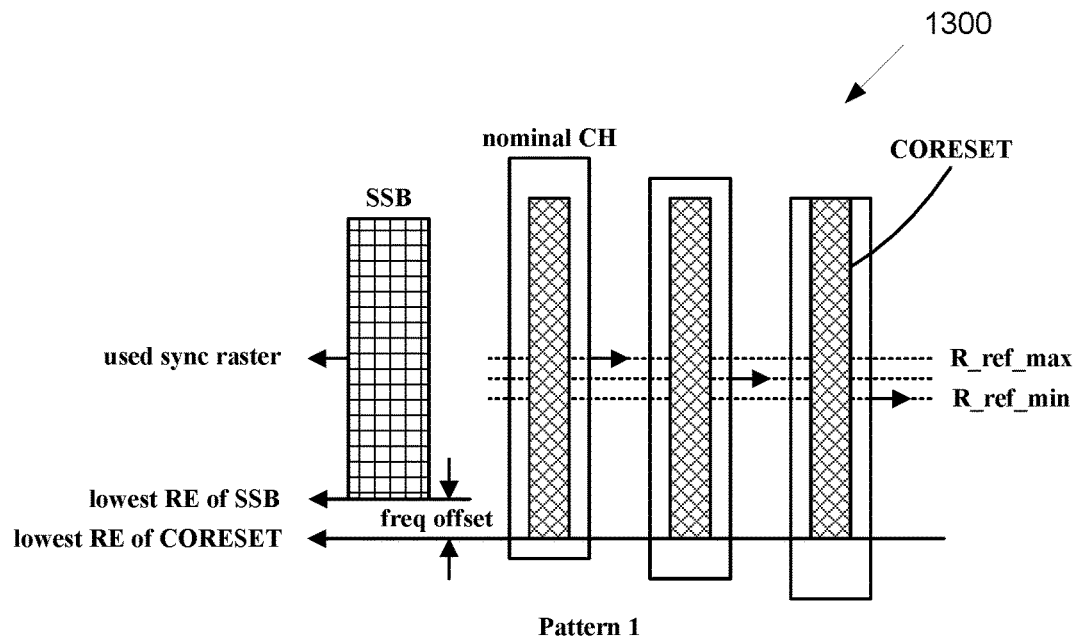
FIG. 13 illustrates an example frequency offset indication for Pattern 1 according to embodiments of the present disclosure.

FIG. 13 illustrates an example frequency offset indication 1300 for Pattern 1 according to embodiments of the present disclosure. An embodiment of the frequency offset indication 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

In one instance, this example can be achieved when synchronization raster is located properly and BW_CH−BW_CORESET is not smaller than the frequency difference range in S_ref (e.g., the range can be defined as the difference between the largest value R_ref_max and smallest value R_ref_min in set S_ref), as illustrated in FIG. 13.

In such instance, a single configuration of RB-level frequency offset ΔF2 is sufficient for all possible channel locations, such as by allocating the relative frequency location of CORESET within the nominal channel BW, e.g., the configuration of ΔF2 can be determined as either: R_sync−R_ref_max+BW_CH/2−BW_SSB*SCS_SSB/SCS_CORESET/2, or e.g., the configuration of ΔF2 can also be determined as R_sync−R_ref_max+BW_CH/2−BW_SSB*SCS_SSB/SCS_CORESET/2−1.

Figure 14:
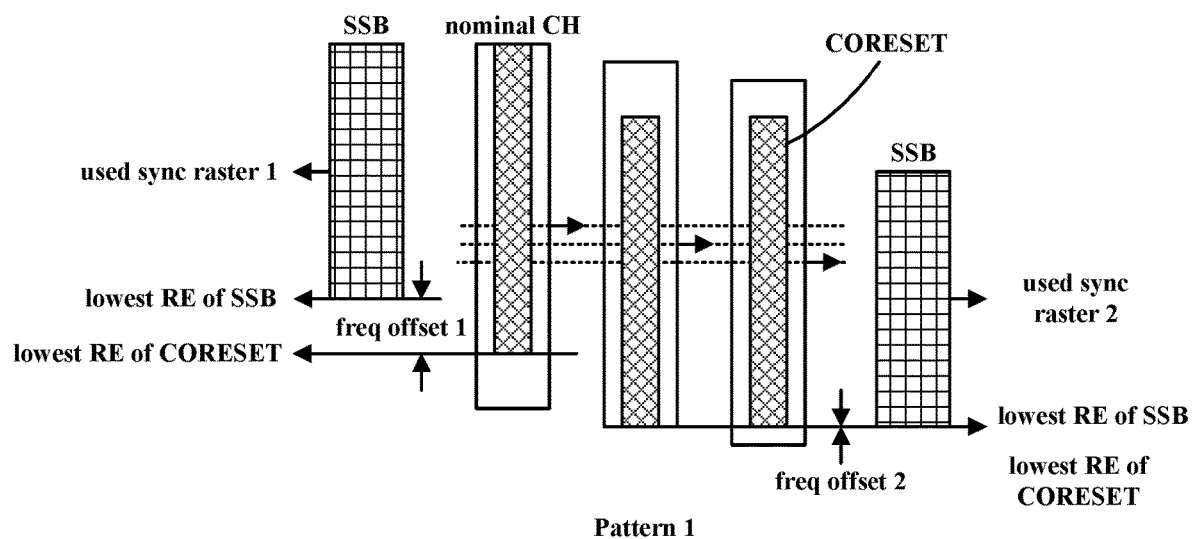
FIG. 14 illustrates another example frequency offset indication for Pattern 1 according to embodiments of the present disclosure.

FIG. 14 illustrates another example frequency offset indication 1400 for Pattern 1 according to embodiments of the present disclosure. An embodiment of the frequency offset indication 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In another example of the frequency offset indication for the pattern 1, the SS/PBCH block and associated CORESET #0 can be both confined within a nominal CH, and the SS/PBCH block cannot locate on one common synchronization raster such that the SS/PBCH block is confined within the BW of nominal CH wherein the nominal CH can be located at any channel rasters supported.

As illustrated in FIG. 14, 2 configurations of ΔF2 are required. In this example, if BW_CH−BW_CORESET−1 is not smaller than the frequency difference range in S_ref (e.g., the range can be defined as the difference between the largest value R_ref_max and smallest value R_ref_min in set S_ref), 2 configurations of ΔF2 are sufficient, and the 2 configurations can be 0 and BW_CORESET−BW_SSB*SCS_SSB/SCS_CORESET.

In yet another example of the frequency offset indication for the pattern 1, the SS/PBCH block and associated CORESET #0 can be both confined within a nominal CH, and the SS/PBCH block can locate on one common synchronization raster such that the SS/PBCH block is confined within the BW of nominal CH wherein the nominal CH can be located at any channel rasters supported. However, in this example, BW_CH−BW_CORESET is smaller than the frequency difference range in S_ref (e.g., the range can be defined as the difference between the largest value R_ref_max and smallest value R_ref_min in set S_ref), such as BW_CH−

BW_CORESET=0 in FIG. 8. Then, the number of configurations of ΔF2 is at least the same as the number of reference frequency locations in S_ref (e.g., set size of S_ref), e.g. each configuration corresponds to a value of R_ref, and the configuration can be given by R_sync-R_ref+BW_CH/2-BW_SSB*SCS_SSB/SCS_CORESET/2.

Figure 15:
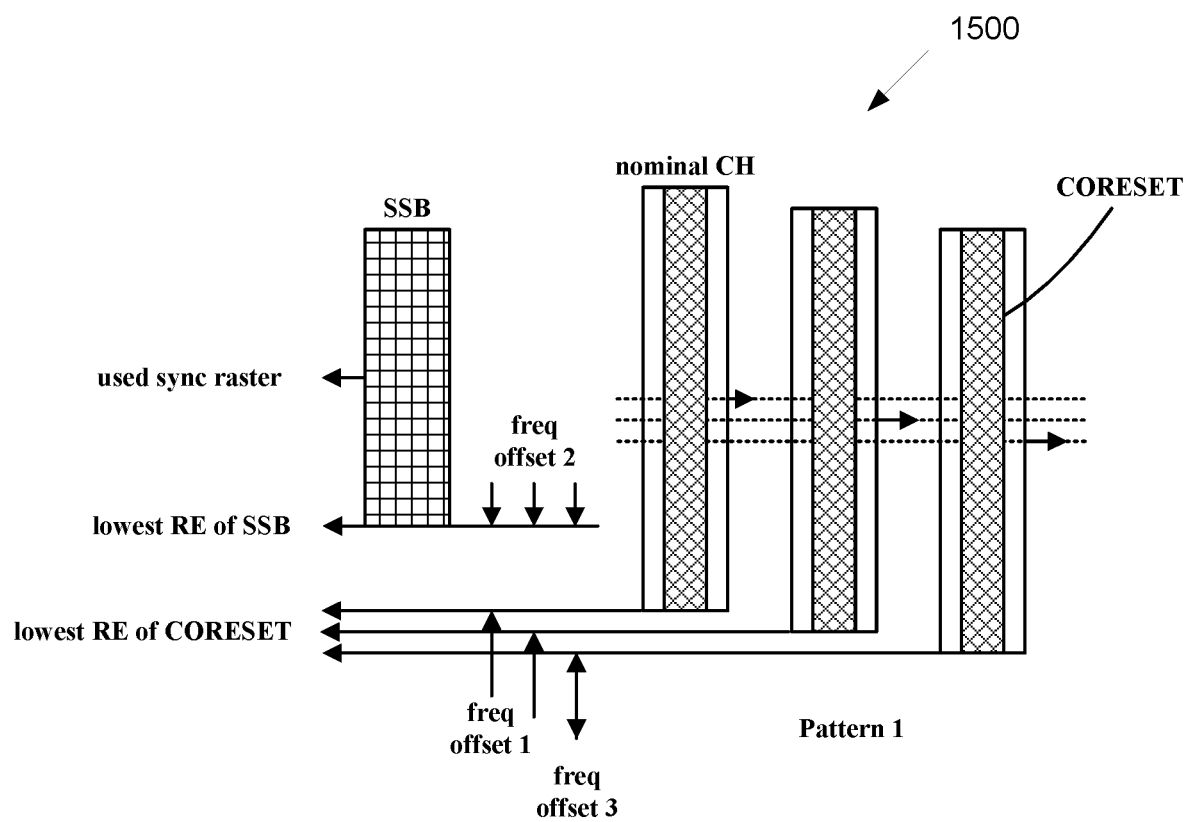
FIG. 15 illustrates yet another example frequency offset indication for Pattern 1 according to embodiments of the present disclosure.

FIG. 15 illustrates yet another example frequency offset indication 1500 for Pattern 1 according to embodiments of the present disclosure. An embodiment of the frequency offset indication 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

Examples of the indication of frequency offset between SS/PBCH block and associated CORESET #0 multiplexed in Pattern 1 for 5 GHz unlicensed spectrum are illustrated in the following part.

The center frequency of nominal channel with bandwidth of 20 MHz is determined by f_c=5160+(g*20) MHz, where 0≤g≤9 or 16≤g≤27, which is illustrated in TABLE 1. A maximum offset of +/−200 kHz to the center frequency is allowed up to implementation.

Global frequency raster, defined for carrier frequency range 3 GHz to 24.25 GHz, is given by 3000+N*1.44 MHz, where N=0:14756, and the corresponding global synchronization channel number (GSCN) is given by 7499+N. Then, the available GSCNs (making sure the SS/PBCH block can be confined within the channel BW) within the range of each nominal channel are given in TABLE 1 as well.

Figure 16:
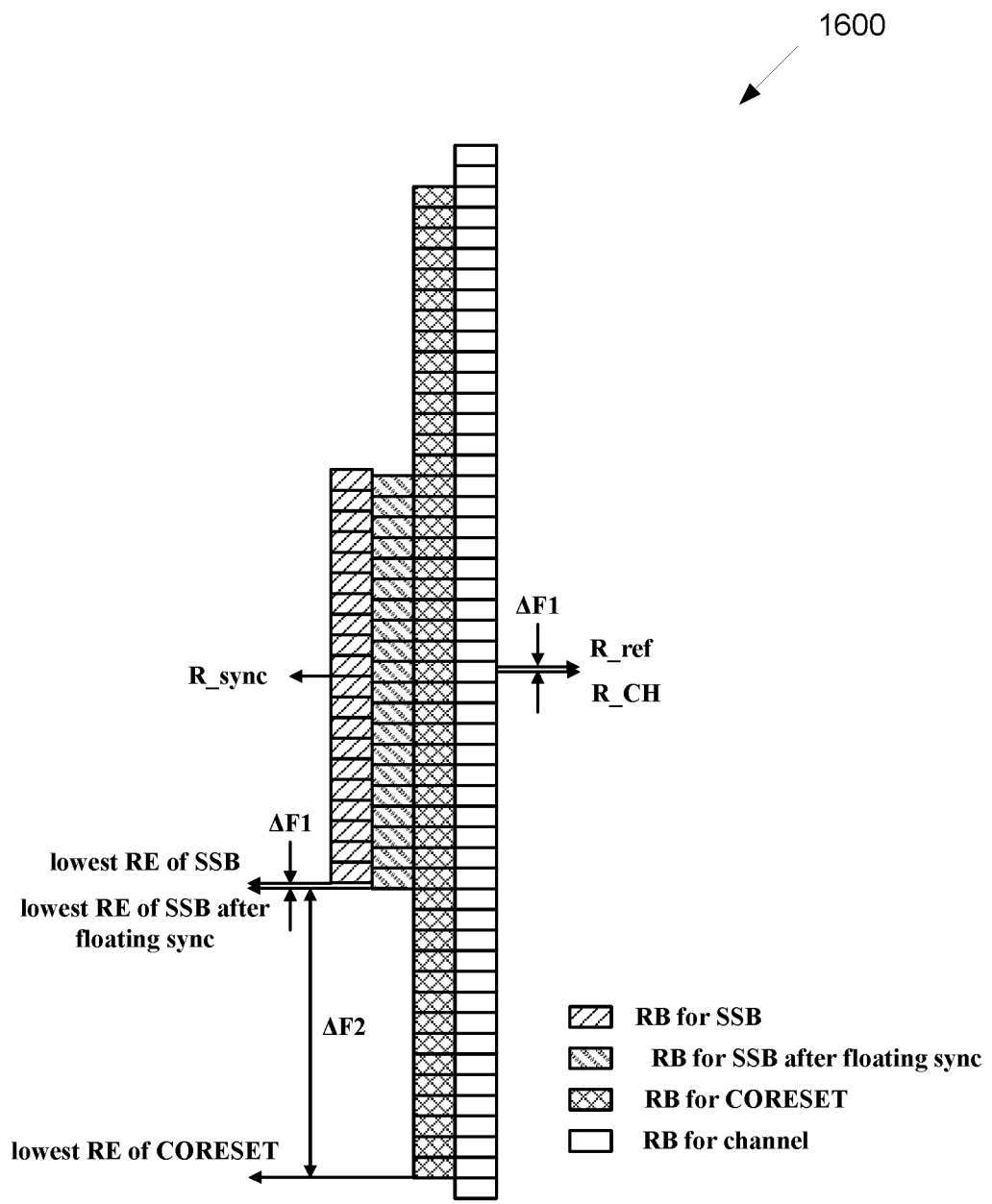
FIG. 16 illustrates an example frequency offset indication according to embodiments of the present disclosure.

FIG. 16 illustrates an example frequency offset indication 1600 according to embodiments of the present disclosure. An embodiment of the frequency offset indication 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

In one example, as illustrated in FIG. 16, 30 kHz is utilized as the SCS of SS/PBCH block and associated PDCCH in CORESET #0 for standalone scenario, and BW_SSB=20 RBs, BW_CORESET=48 RBs, BW_CH=51 RBs. Moreover, the granularity of channel rasters for a given nominal channel is determined as the same as the SCS of CORESET #0, e.g., 30 kHz, and the corresponding channel rasters for a given nominal channel are confined within the range f_c−200 kHz to f_c+200 kHz due to regulation.

In one instance, under this assumption, the channel rasters supported can be expressed in way that R_CH=f_c+K*30 kHz, such that f_c is RE grid aligned with the utilized synchronization raster for this nominal channel, and K is an integer satisfying R_CH to be within the range each of f_c−200 kHz to f_c+200 kHz. This supported channel raster R_CH can be expressed in an alternative way R_CH=R_ref−ΔF1*30 kHz, wherein R_ref is a reference channel raster such that the resource block grid of the located nominal channel on this raster is aligned with the resource block grid of the SS/PBCH block on a synchronization raster defined by a GSCN in the range of this nominal channel, and ΔF1 is the RE level frequency offset in the numerology of SCS_CORESET=30 kHz with 0≤ΔF1≤11.

Since the range of all possible channel rasters for a given nominal channel is at most 400 kHz and smaller than 2 RBs, at most 3 different values of R_ref are sufficient to express all the possible channel rasters for a given supported channels, such that R_ref_max−R_ref_min=2 RB, wherein R_ref_max is the larger one of set of R_ref and R_ref_min is the smaller one of the set of R_ref. Then, BW_CH−BW_CORESET>R_ref_max−R_ref_min, and the indication method for Pattern 1 as illustrated in FIG. 13 can be

TABLE 1

Center frequency of nominal channels for 5 GHz unlicensed spectrum

| Nominal Channel Index | g | f_c (MHz) | Channel Range (30 kHz SCS) | | | Channel Range (60 kHz SCS) | | |
|---|---|---|---|---|---|---|---|---|
| | | | start | end | available GSCN | start | end | available GSCN |
| 0 | 0 | 5160 | 5150.82 | 5169.18 | 8996-9002 | 5151.36 | 5168.64 | 8996-9002 |
| 1 | 1 | 5180 | 5170.82 | 5189.18 | 9010-9016 | 5171.36 | 5188.64 | 9010-9016 |
| 2 | 2 | 5200 | 5190.82 | 5209.18 | 9023-9030 | 5191.36 | 5208.64 | 9023-9030 |
| 3 | 3 | 5220 | 5210.82 | 5229.18 | 9037-9044 | 5211.36 | 5228.64 | 9038-9044 |
| 4 | 4 | 5240 | 5230.82 | 5249.18 | 9051-9058 | 5231.36 | 5248.64 | 9052-9058 |
| 5 | 5 | 5260 | 5250.82 | 5269.18 | 9065-9072 | 5251.36 | 5268.64 | 9065-9071 |
| 6 | 6 | 5280 | 5270.82 | 5289.18 | 9079-9086 | 5271.36 | 5288.64 | 9079-9085 |
| 7 | 7 | 5300 | 5290.82 | 5309.18 | 9093-9100 | 5291.36 | 5308.64 | 9093-9099 |
| 8 | 8 | 5320 | 5310.82 | 5329.18 | 9107-9113 | 5311.36 | 5328.64 | 9107-9113 |
| 9 | 9 | 5340 | 5330.82 | 5349.18 | 9121-9127 | 5331.36 | 5348.64 | 9121-9127 |
| 10 | 16 | 5480 | 5470.82 | 5489.18 | 9218-9225 | 5471.36 | 5488.64 | 9218-9224 |
| 11 | 17 | 5500 | 5490.82 | 5509.18 | 9232-9238 | 5491.36 | 5508.64 | 9232-9238 |
| 12 | 18 | 5520 | 5510.82 | 5529.18 | 9246-9252 | 5511.36 | 5528.64 | 9246-9252 |
| 13 | 19 | 5540 | 5530.82 | 5549.18 | 9260-9266 | 5531.36 | 5548.64 | 9260-9266 |
| 14 | 20 | 5560 | 5550.82 | 5569.18 | 9273-9280 | 5551.36 | 5568.64 | 9274-9280 |
| 15 | 21 | 5580 | 5570.82 | 5589.18 | 9287-9294 | 5571.36 | 5588.64 | 9288-9294 |
| 16 | 22 | 5600 | 5590.82 | 5609.18 | 9301-9308 | 5591.36 | 5608.64 | 9302-9308 |
| 17 | 23 | 5620 | 5610.82 | 5629.18 | 9315-9322 | 5611.36 | 5628.64 | 9315-9322 |
| 18 | 24 | 5640 | 5630.82 | 5649.18 | 9329-9336 | 5631.36 | 5648.64 | 9329-9335 |
| 19 | 25 | 5660 | 5650.82 | 5669.18 | 9343-9350 | 5651.36 | 5668.64 | 9343-9349 |
| 20 | 26 | 5680 | 5670.82 | 5689.18 | 9357-9363 | 5671.36 | 5688.64 | 9357-9363 |
| 21 | 27 | 5700 | 5690.82 | 5709.18 | 9371-9377 | 5691.36 | 5708.64 | 9371-9377 | utilized for this example, e.g., 1 configuration on the RB level frequency offset ΔF2 is sufficient, and the configuration can be given by R_sync−R_ref_max+BW_CH/2−BW_SSB/2−1.

A list of the configuration in the pattern 1 for the nominal channels defined for 5 GHz unlicensed spectrum is illustrated in TABLE 2, wherein the synchronization rasters are assumed to be with an interval of 20.16 MHz (e.g., GSCN down-selection factor of 14) for each subgroup of nominal channels and R_ref_max is the largest one of all the R_ref supported for a given nominal channels.

In TABLE 2, it can be observed that if configuring ΔF1 using a separate field from ΔF2 (such as 4 bits), the configuration of ΔF2 can be hard-coded (e.g. only 1 configuration); if configuring ΔF1 and ΔF2 jointly using a common field, 4 bits are sufficient for the configuration of the combination of ΔF1 and ΔF2.

RBs. Moreover, the granularity of channel rasters for a given nominal channel is determined as 100 kHz, and the corresponding channel rasters for a given nominal channel are confined within the range f_c−200 kHz to f_c+200 kHz due to regulation. For instance, under this assumption, the channel rasters supported can be expressed in way that R_CH=f_c+K*100 kHz, wherein K is from {−2, −1, 0, 1, 2} to satisfy R_CH to be within the range each of f_c−200 kHz to f_c+200 kHz.

This supported channel raster R_CH can be expressed in an alternative way R_CH=R_ref−ΔF1*30 kHz, wherein R_ref is a reference channel raster such that the resource block grid of the located nominal channel on this raster is aligned with the resource block grid of the SS/PBCH block on a synchronization raster defined by a GSCN with poten-

TABLE 2

Example of configuration of RE and RB level frequency offset for 5 GHz unlicensed spectrum

| Nominal Channel Index | f_c (MHz) | f_c' (MHz) | K | R_ref (MHz) | R_sync (MHz) | ΔF1 (30 kHz SCS RE) | ΔF2 (30 kHz SCS RB) |
|---|---|---|---|---|---|---|---|
| 0 | 5160 | 5160 | −5:6<br>−6 | 5160.18<br>5159.82 | 5160 | 6-K<br>−6-K | 14 |
| 1 | 5180 | 5180.01 | 0:6<br>−7:−1 | 5180.34<br>5179.98 | 5180.16 | 11-K<br>−1-K | 14 |
| 2 | 5200 | 5199.99 | 6:7<br>−6:5 | 5200.5<br>5200.14 | 5200.32 | 17-K<br>5-K | 14 |
| 3 | 5220 | 5220 | −1:6<br>−6:−2 | 5220.3<br>5219.94 | 5220.48 | 10-K<br>−2-K | 15 |
| 4 | 5240 | 5240.01 | 4:6<br>−7:3 | 5240.46<br>5240.1 | 5240.64 | 15-K<br>3-K | 15 |
| 5 | 5260 | 5259.99 | −2:7<br>−6:−3 | 5260.26<br>5259.9 | 5260.8 | 9-K<br>−3-K | 16 |
| 6 | 5280 | 5280 | 3:6<br>−6:2 | 5280.42<br>5280.06 | 5280.96 | 14-K<br>2-K | 16 |
| 7 | 5300 | 5300.01 | −4:6<br>−6:−5 | 5300.22<br>5299.86 | 5301.12 | 7-K<br>−5-K | 17 |
| 8 | 5320 | 5319.99 | 2:7<br>−6:1 | 5320.38<br>5320.02 | 5321.28 | 13-K<br>1-K | 17 |
| 9 | 5340 | 5340 | −5:6<br>−6:−3 | 5340.18<br>5339.82 | 5341.44 | 6-K<br>−6-K | 18 |
| 10 | 5480 | 5480.01 | −4:6<br>−7:−5 | 5480.22<br>5479.86 | 5479.68 | 7-K<br>−5-K | 13 |
| 11 | 5500 | 5499.99 | 2:7<br>−6:1 | 5500.38<br>5500.02 | 5499.84 | 13-K<br>1-K | 13 |
| 12 | 5520 | 5520 | −5:6<br>−6 | 5520.18<br>5519.82 | 5520 | 6-K<br>−6-K | 14 |
| 13 | 5540 | 5540.01 | 0:6<br>−7:−1 | 5540.34<br>5539.98 | 5540.16 | 11-K<br>−1-K | 14 |
| 14 | 5560 | 5559.99 | 6:7<br>−6:5 | 5560.5<br>5560.14 | 5560.32 | 17-K<br>5-K | 14 |
| 15 | 5580 | 5580 | −1:6<br>−6:−2 | 5580.3<br>5579.94 | 5580.48 | 10-K<br>−2-K | 15 |
| 16 | 5600 | 5600.01 | 4:6<br>−7:3 | 5600.46<br>5600.1 | 5600.64 | 15-K<br>3-K | 15 |
| 17 | 5620 | 5619.99 | −2:7<br>−6:−3 | 5620.26<br>5619.9 | 5620.8 | 9-K<br>−3-K | 16 |
| 18 | 5640 | 5640 | 3:6<br>−6:2 | 5640.42<br>5640.06 | 5640.96 | 14-K<br>2-K | 16 |
| 19 | 5660 | 5660.01 | −4:6<br>−6:−5 | 5660.22<br>5659.86 | 5661.12 | 7-K<br>−5-K | 17 |
| 20 | 5680 | 5679.99 | 2:7<br>−6:1 | 5680.38<br>5680.02 | 5681.28 | 13-K<br>1-K | 17 |
| 21 | 5700 | 5700 | −5:6<br>−6 | 5700.18<br>5699.82 | 5701.44 | 6-K<br>−6-K | 18 |

In another example, as illustrated in FIG. 16, 30 kHz is utilized as the SCS of SS/PBCH block and associated PDCCH in CORESET #0 for standalone scenario, and BW_SSB=20 RBs, BW_CORESET=48 RBs, BW_CH=51 tial offset from {−100 kHz, 0 kHz, +100 kHz} in the range of this nominal channel, and ΔF1 is the RE level frequency offset in the numerology of SCS_CORESET=30 kHz with 0≤ΔF1≤11.

Since the range of all possible channel rasters for a given nominal channel is at most 400 kHz and smaller than 2 RBs, for a given synchronization raster (e.g. 1 from the set of potential offsets {−100 kHz, 0 kHz, +100 kHz}), at most 2 different values of R_ref are sufficient to express all the possible channel rasters for a given supported channels, such that R_ref_max−R_ref_min=1 RB, wherein R_ref_max is the larger one of set of R_ref and R_ref_min is the smaller one of the set of R_ref, wherein R_ref is corresponding to R_sync. Then, BW_CH−BW_CORESET>R_ref_max−R_ref_min, and the indication method for the pattern 1 as illustrated in FIG. 13 can be utilized for this example, e.g., 1 configuration on the RB level frequency offset ΔF2 is sufficient, and the configuration can be given by R_sync−R_ref_max+BW_CH/2−BW_SSB/2−1.

A list of the configuration in the pattern 1 for the nominal channels defined for 5 GHz unlicensed spectrum is illustrated in TABLE 3. In TABLE 3, the synchronization rasters are assumed to be with an interval of 20.16 MHz (e.g., GSCN down-selection factor of 14) for each subgroup of nominal channels and R_ref_max is the largest one of all the R_ref corresponding to the same R_sync supported for a given nominal channels.

In TABLE 3, it can be observed that for a given R_sync where a UE detected an SS/PBCH block, at most 2 configurations on the combination of ΔF1 and ΔF2 are sufficient to indicate the location of CORESET #0, and hence, 1 bit is sufficient for the configuration on the combination of ΔF1 and ΔF2 (or using 1 bit for the configuration of ΔF1, and ΔF2 can be hard-coded for an associated ΔF1 and for a given nominal channel).

TABLE 3

Example of configuration of RE and RB level frequency offset for 5 GHz unlicensed spectrum.

| Nominal Channel Index | f_c (MHz) | K | R_CH (MHz) | R_ref (MHz) | R_sync (MHz) | ΔF1 (30 kHz SCS RE) | ΔF2 (30 kHz SCS RB) |
|---|---|---|---|---|---|---|---|
| 0 | 5160 | 2 | 5160.2 | 5160.44 | 5159.9 | 8 | 13 |
|   |   | 1 | 5160.1 | 5160.28 | 5160.1 | 6 | 14 |
|   |   | 0 | 5160 | 5160.18 | 5160 | 6 | 14 |
|   |   | −1 | 5159.9 | 5160.08 | 5159.9 | 6 | 13 |
|   |   | −2 | 5159.8 | 5159.92 | 5160.1 | 4 | 14 |
| 1 | 5180 | 2 | 5180.2 | 5180.44 | 5180.26 | 8 | 14 |
|   |   | 1 | 5180.1 | 5180.34 | 5180.16 | 8 | 14 |
|   |   | 0 | 5180 | 5180.24 | 5180.06 | 8 | 14 |
|   |   | −1 | 5179.9 | 5180.08 | 5180.26 | 6 | 14 |
|   |   | −2 | 5179.8 | 5179.98 | 5180.16 | 6 | 14 |
| 2 | 5200 | 2 | 5200.2 | 5200.5 | 5200.32 | 10 | 14 |
|   |   | 1 | 5200.1 | 5200.4 | 5200.22 | 10 | 14 |
|   |   | 0 | 5200 | 5200.24 | 5200.42 | 8 | 15 |
|   |   | −1 | 5199.9 | 5200.14 | 5200.32 | 8 | 14 |
|   |   | −2 | 5199.8 | 5200.04 | 5200.22 | 8 | 14 |
| 3 | 5220 | 2 | 5220.2 | 5220.2 | 5220.38 | 0 | 15 |
|   |   | 1 | 5220.1 | 5220.4 | 5220.58 | 10 | 15 |
|   |   | 0 | 5220 | 5220.3 | 5220.48 | 10 | 15 |
|   |   | −1 | 5219.9 | 5220.2 | 5220.38 | 10 | 15 |
|   |   | −2 | 5219.8 | 5220.04 | 5220.58 | 8 | 15 |
| 4 | 5240 | 2 | 5240.2 | 5240.2 | 5240.74 | 0 | 16 |
|   |   | 1 | 5240.1 | 5240.1 | 5240.64 | 0 | 16 |
|   |   | 0 | 5240 | 5240 | 5240.54 | 0 | 16 |
|   |   | −1 | 5239.9 | 5240.2 | 5240.74 | 10 | 16 |
|   |   | −2 | 5239.8 | 5240.1 | 5240.64 | 10 | 16 |
| 5 | 5260 | 2 | 5260.2 | 5260.26 | 5260.8 | 2 | 16 |
|   |   | 1 | 5260.1 | 5260.16 | 5260.7 | 2 | 16 |
|   |   | 0 | 5260 | 5260 | 5260.9 | 0 | 17 |
|   |   | −1 | 5259.9 | 5259.9 | 5260.8 | 0 | 16 |
|   |   | −2 | 5259.8 | 5259.8 | 5260.7 | 0 | 16 |
| 6 | 5280 | 2 | 5280.2 | 5280.32 | 5280.86 | 4 | 16 |
|   |   | 1 | 5280.1 | 5280.16 | 5281.06 | 2 | 17 |
| 7 | 5300 | 0 | 5280 | 5280.06 | 5280.96 | 2 | 17 |
|   |   | −1 | 5279.9 | 5279.96 | 5280.86 | 2 | 16 |
|   |   | −2 | 5279.8 | 5279.8 | 5281.06 | 0 | 17 |
|   |   | 2 | 5300.2 | 5300.32 | 5301.22 | 4 | 17 |
|   |   | 1 | 5300.1 | 5300.22 | 5301.12 | 4 | 17 |
|   |   | 0 | 5300 | 5300.06 | 5301.32 | 2 | 18 |
|   |   | −1 | 5299.9 | 5299.96 | 5301.22 | 2 | 17 |
|   |   | −2 | 5299.8 | 5299.86 | 5301.12 | 2 | 17 |
| 8 | 5320 | 2 | 5320.2 | 5320.38 | 5321.28 | 6 | 17 |
|   |   | 1 | 5320.1 | 5320.28 | 5321.18 | 6 | 17 |
|   |   | 0 | 5320 | 5320.12 | 5321.38 | 4 | 18 |
|   |   | −1 | 5319.9 | 5320.02 | 5321.28 | 4 | 17 |
|   |   | −2 | 5319.8 | 5319.92 | 5321.18 | 4 | 17 |
| 9 | 5340 | 2 | 5340.2 | 5340.44 | 5341.34 | 8 | 17 |
|   |   | 1 | 5340.1 | 5340.34 | 5341.24 | 8 | 17 |
|   |   | 0 | 5340 | 5340.18 | 5341.44 | 6 | 18 |
|   |   | −1 | 5339.9 | 5340.08 | 5341.34 | 6 | 17 |
|   |   | −2 | 5339.8 | 5339.98 | 5341.24 | 6 | 17 |

In yet another example, 60 kHz is utilized as the SCS of SS/PBCH block and associated PDCCH in CORESET #0 for standalone scenario, and BW_SSB=20 RBs, BW_CORESET=24 RBs, BW_CH=24 RBs. Moreover, the granularity of channel rasters for a given nominal channel is determined as the same as the SCS of CORESET #0, e.g., 60 kHz, and the corresponding channel rasters for a given nominal channel are confined within the range f_c−200 kHz to f_c+200 kHz due to regulation.

For instance, under this assumption, the channel rasters supported can be expressed in way that R_CH=f_c+K*60 kHz, such that f_c is RE grid aligned with the utilized synchronization raster for this nominal channel, and K is an integer satisfying R_CH to be within the range each of f_c−200 kHz to f_c+200 kHz. This supported channel raster R_CH can be expressed in an alternative way R_CH=R_ref−ΔF1*60 kHz, wherein R_ref is a reference channel raster such that the resource block grid of the located nominal channel on this raster is aligned with the resource block grid of the SS/PBCH block on a synchronization raster defined by a GSCN in the range of this nominal channel, and ΔF1 is the RE level frequency offset in the numerology of SCS_CORESET=60 kHz with 0≤ΔF1≤11.

Since the range of all possible channel rasters for a given nominal channel is at most 400 kHz and smaller than 1 RBs, at most 2 different values of R_ref are sufficient to express all the possible channel rasters for a given supported channels, such that R_ref_max−R_ref_min=1 RB, wherein R_ref_max is the larger one of set of R_ref and R_ref_min is the smaller one of the set of R_ref. Then, since BW_CH−BW_CORESET=0, the number of configurations of ΔF2 is at least the same as the number of reference frequency locations in S_ref (e.g., at most 2 in this example). Each configuration corresponds to a value of R_ref, and the configuration can be given by R_sync−R_ref+BW_CH/2−BW_SSB/2.

A list of the configuration in the pattern 1 for the nominal channels defined for 5 GHz unlicensed spectrum is illustrated in TABLE 4, wherein the synchronization rasters are assumed to be with an interval of 20.16 MHz (e.g., GSCN down-selection factor of 14) for each subgroup of nominal channels. From TABLE 4, it can be observed that for a given R_sync where a UE detected an SS/PBCH block, at most 2 configurations on the combination of ΔF2 are sufficient to indicate the location of CORESET #0, and hence, if ΔF1 and ΔF2 are encoded separately, 1 bit is sufficient for the configuration on ΔF2; if ΔF1 and ΔF2 are jointly encoded, 3 bits in total is sufficient for the configuration on the combination of ΔF1 and ΔF2.

In TABLE 5, the synchronization rasters are assumed to be with an interval of 20.16 MHz (e.g., GSCN down-selection factor of 14) for each subgroup of nominal channels and R_ref_max is the largest one of all the R_ref corresponding to the same R_sync supported for a given nominal channels.

TABLE 4

Example of configuration of RE and RB level frequency offset for 5 GHz unlicensed spectrum

| Nominal Channel Index | f_c (MHz) | f_c' (MHz) | K | R_ref (MHz) | R_sync (MHz) | ΔF1 (60 kHz SCS RE) | ΔF2 (60 kHz SCS RB) |
|---|---|---|---|---|---|---|---|
| 0 | 5160 | 5160 | 1:3 | 5160.72 | 5160 | 12-K | 1 |
|   |   |   | -3:0 | 5160 |   | -K | 2 |
| 1 | 5180 | 5179.98 | -3:3 | 5180.16 | 5180.16 | 3-K | 2 |
| 2 | 5200 | 5200.02 | -3:3 | 5200.32 | 5200.32 | 5-K | 2 |
| 3 | 5220 | 5220 | -3:3 | 5220.48 | 5220.48 | 8-K | 2 |
| 4 | 5240 | 5239.98 | 0:3 | 5240.64 | 5240.64 | 11-K | 2 |
|   |   |   | -3:-1 | 5239.92 |   | -1-K | 3 |
| 5 | 5260 | 5260.02 | 2:3 | 5260.8 | 5260.8 | 13-K | 2 |
|   |   |   | -3:1 | 5260.08 |   | 1-K | 3 |
| 6 | 5280 | 5280 | -3:3 | 5280.24 | 5280.96 | 4-K | 3 |
| 7 | 5300 | 5299.98 | -3:3 | 5300.4 | 5301.12 | 7-K | 3 |
| 8 | 5320 | 5320.02 | -2:3 | 5320.56 | 5321.28 | 9-K | 3 |
|   |   |   | -3 | 5319.84 |   | -3-K | 4 |
| 9 | 5340 | 5340 | 1:3 | 5340.72 | 5341.44 | 12-K | 3 |
|   |   |   | -3:0 | 5340 |   | -K | 4 |

In yet another example, 60 kHz is utilized as the SCS of SS/PBCH block and associated PDCCH in CORESET #0 for standalone scenario, and BW_SSB=20 RBs, BW_CORESET=24 RBs, BW_CH=24 RBs. Moreover, the granularity of channel rasters for a given nominal channel is determined as 100 kHz, and the corresponding channel rasters for a given nominal channel are confined within the range f_c−200 kHz to f_c+200 kHz due to regulation. For instance, under this assumption, the channel rasters supported can be expressed in way that R_CH=f_c+K*100 kHz, wherein K is from {−2, −1, 0, 1, 2} to satisfy R_CH to be within the range each of f_c−200 kHz to f_c+200 kHz.

This supported channel raster R_CH can be expressed in an alternative way R_CH=R_ref−ΔF1*60 kHz, wherein R_ref is a reference channel raster such that the resource block grid of the located nominal channel on this raster is aligned with the resource block grid of the SS/PBCH block on a synchronization raster defined by a GSCN with potential offset from {−100 kHz, 0 kHz, +100 kHz} in the range of this nominal channel, and ΔF1 is the RE level frequency offset in the numerology of SCS_CORESET=60 kHz with 0≤ΔF1≤11.

Since the range of all possible channel rasters for a given nominal channel is at most 400 kHz and smaller than 1 RB s, for a given synchronization raster (e.g., 1 from the set of potential offsets {−100 kHz, 0 kHz, +100 kHz}), at most 2 different values of R_ref are sufficient to express all the possible channel rasters for a given supported channels. Since BW_CH−BW_CORESET=0, the number of configurations of ΔF2 is at least the same as the number of reference frequency locations in S_ref (e.g., at most 2 in this example). Each configuration corresponds to a value of R_ref, and the configuration can be given by R_sync-R_ref+BW_CH/2−BW_SSB/2. A list of the configuration in the pattern 1 for the nominal channels defined for 5 GHz unlicensed spectrum is illustrated in TABLE 5.

In TABLE 5, it can be observed that for a given R_sync where a UE detected an SS/PBCH block, at most 2 configurations on the combination of ΔF1 and ΔF2 are sufficient to indicate the location of CORESET #0, and hence, 1 bit is sufficient for the configuration on the combination of ΔF1 and ΔF2 (or using 1 bit for the configuration of ΔF1, and ΔF2 can be hard-coded for an associated ΔF1 and for a given nominal channel).

TABLE 5

Example of configuration of RE and RB level frequency offset for 5 GHz unlicensed spectrum

| Nominal Channel Index | f_c (MHz) | K | R_CH (MHz) | R_ref (MHz) | R_sync (MHz) | ΔF1 (60 kHz SCS RE) | ΔF2 (60 kHz SCS RB) |
|---|---|---|---|---|---|---|---|
| 0 | 5160 | 2 | 5160.2 | 5160.62 | 5159.9 | 7.00 | 1 |
|   |   | 1 | 5160.1 | 5160.1 | 5160.1 | 0.00 | 2 |
|   |   | 0 | 5160 | 5160 | 5160 | 0.00 | 2 |
|   |   | -1 | 5159.9 | 5159.9 | 5159.9 | 0.00 | 2 |
|   |   | -2 | 5159.8 | 5160.1 | 5160.1 | 5.00 | 2 |
| 1 | 5180 | 2 | 5180.2 | 5180.26 | 5180.26 | 1.00 | 2 |
|   |   | 1 | 5180.1 | 5180.16 | 5180.16 | 1.00 | 2 |
|   |   | 0 | 5180 | 5180.06 | 5180.06 | 1.00 | 2 |
|   |   | -1 | 5179.9 | 5180.26 | 5180.26 | 6.00 | 2 |
|   |   | -2 | 5179.8 | 5180.16 | 5180.16 | 6.00 | 2 |
| 2 | 5200 | 2 | 5200.2 | 5200.32 | 5200.32 | 2.00 | 2 |
|   |   | 1 | 5200.1 | 5200.22 | 5200.22 | 2.00 | 2 |
|   |   | 0 | 5200 | 5200.42 | 5200.42 | 7.00 | 2 |
|   |   | -1 | 5199.9 | 5200.32 | 5200.32 | 7.00 | 2 |
|   |   | -2 | 5199.8 | 5200.22 | 5200.22 | 7.00 | 2 |
| 3 | 5220 | 2 | 5220.2 | 5220.38 | 5220.38 | 3.00 | 2 |
|   |   | 1 | 5220.1 | 5220.58 | 5220.58 | 8.00 | 2 |
|   |   | 0 | 5220 | 5220.48 | 5220.48 | 8.00 | 2 |
|   |   | -1 | 5219.9 | 5220.38 | 5220.38 | 8.00 | 2 |
|   |   | -2 | 5219.8 | 5219.86 | 5220.58 | 1.00 | 3 |
| 4 | 5240 | 2 | 5240.2 | 5240.74 | 5240.74 | 9.00 | 2 |
|   |   | 1 | 5240.1 | 5240.64 | 5240.64 | 9.00 | 2 |
|   |   | 0 | 5240 | 5240.54 | 5240.54 | 9.00 | 2 |

TABLE 5-continued

Example of configuration of RE and RB level frequency offset for 5 GHz unlicensed spectrum

| Nominal Channel Index | f_c (MHz) | K | R_CH (MHz) | R_ref (MHz) | R_sync (MHz) | ΔF1 (60 kHz SCS RE) | ΔF2 (60 kHz SCS RB) |
|---|---|---|---|---|---|---|---|
| | | -1 | 5239.9 | 5240.02 | 5240.74 | 2.00 | 3 |
| | | -2 | 5239.8 | 5239.92 | 5240.64 | 2.00 | 3 |
| 5 | 5260 | 2 | 5260.2 | 5260.8 | 5260.8 | 10.00 | 2 |
| | | 1 | 5260.1 | 5260.7 | 5260.7 | 10.00 | 2 |
| | | 0 | 5260 | 5260.18 | 5260.9 | 3.00 | 3 |
| | | -1 | 5259.9 | 5260.08 | 5260.8 | 3.00 | 3 |
| | | -2 | 5259.8 | 5259.98 | 5260.7 | 3.00 | 3 |
| 6 | 5280 | 2 | 5280.2 | 5280.86 | 5280.86 | 11.00 | 2 |
| | | 1 | 5280.1 | 5280.34 | 5281.06 | 4.00 | 3 |
| | | 0 | 5280 | 5280.24 | 5280.96 | 4.00 | 3 |
| | | -1 | 5279.9 | 5280.14 | 5280.86 | 4.00 | 3 |
| | | -2 | 5279.8 | 5280.34 | 5281.06 | 9.00 | 3 |
| 7 | 5300 | 2 | 5300.2 | 5300.5 | 5301.22 | 5.00 | 3 |
| | | 1 | 5300.1 | 5300.4 | 5301.12 | 5.00 | 3 |
| | | 0 | 5300 | 5300.6 | 5301.32 | 10.00 | 3 |
| | | -1 | 5299.9 | 5300.5 | 5301.22 | 10.00 | 3 |
| | | -2 | 5299.8 | 5300.4 | 5301.12 | 10.00 | 3 |
| 8 | 5320 | 2 | 5320.2 | 5320.56 | 5321.28 | 6.00 | 3 |
| | | 1 | 5320.1 | 5320.46 | 5321.18 | 6.00 | 3 |
| | | 0 | 5320 | 5320.66 | 5321.38 | 11.00 | 3 |
| | | -1 | 5319.9 | 5320.56 | 5321.28 | 11.00 | 3 |
| | | -2 | 5319.8 | 5320.46 | 5321.18 | 11.00 | 3 |
| 9 | 5340 | 2 | 5340.2 | 5340.62 | 5341.34 | 7.00 | 3 |
| | | 1 | 5340.1 | 5340.52 | 5341.24 | 7.00 | 3 |
| | | 0 | 5340 | 5340 | 5341.44 | 0.00 | 4 |
| | | -1 | 5339.9 | 5339.9 | 5341.34 | 0.00 | 4 |
| | | -2 | 5339.8 | 5339.8 | 5341.24 | 0.00 | 4 |

In one example, the frequency offset can be determined by an RB level frequency offset ΔF, and there is no RE level frequency offset required (e.g., an RE level frequency offset can be considered as fixed as 0, such that the field k_SSB in the PBCH content for indicating the RE-level frequency offset could be reserved for other purpose, or the k_SSB is always assumed as 0 in this example), wherein for example the RB is expressed in the SCS of PDCCH monitored in CORESET #0.

In such example, there can be a single channel raster supported for a nominal channel with respect to a given SCS, which can be expressed as R_CH, and the corresponding resource block grid of the channel located on R_CH is aligned with the resource block grid of SS/PBCH block located on a synchronization raster. In one consideration, all the supported channels for a given band are aligned with the same resource block grid (e.g., same common resource block grid with respect to same subcarrier spacing and using the same reference Point A).

In one instance, the interval between neighboring channel raster entries for nominal channels is an integer multiple of RBs with respect to the subcarrier spacing of the common resource grid, and the guard band between neighboring nominal channels is also an integer multiple of RBs with respect to the subcarrier spacing of the common resource grid.

In another instance, the interval between neighboring channel raster entries for nominal channels may not be the same (e.g. one interval could have same or different value from another interval), and the guard band between neighboring nominal channels may not be the same (e.g., one guard band could have same or different value from another guard band).

In another instance, all the synchronization raster entries are down-selected from Rel-15 GSCN values. In another instance, the interval between the neighboring synchronization raster entries for nominal channels can be not uniform, e.g., the interval can take same or different values.

Figure 17:
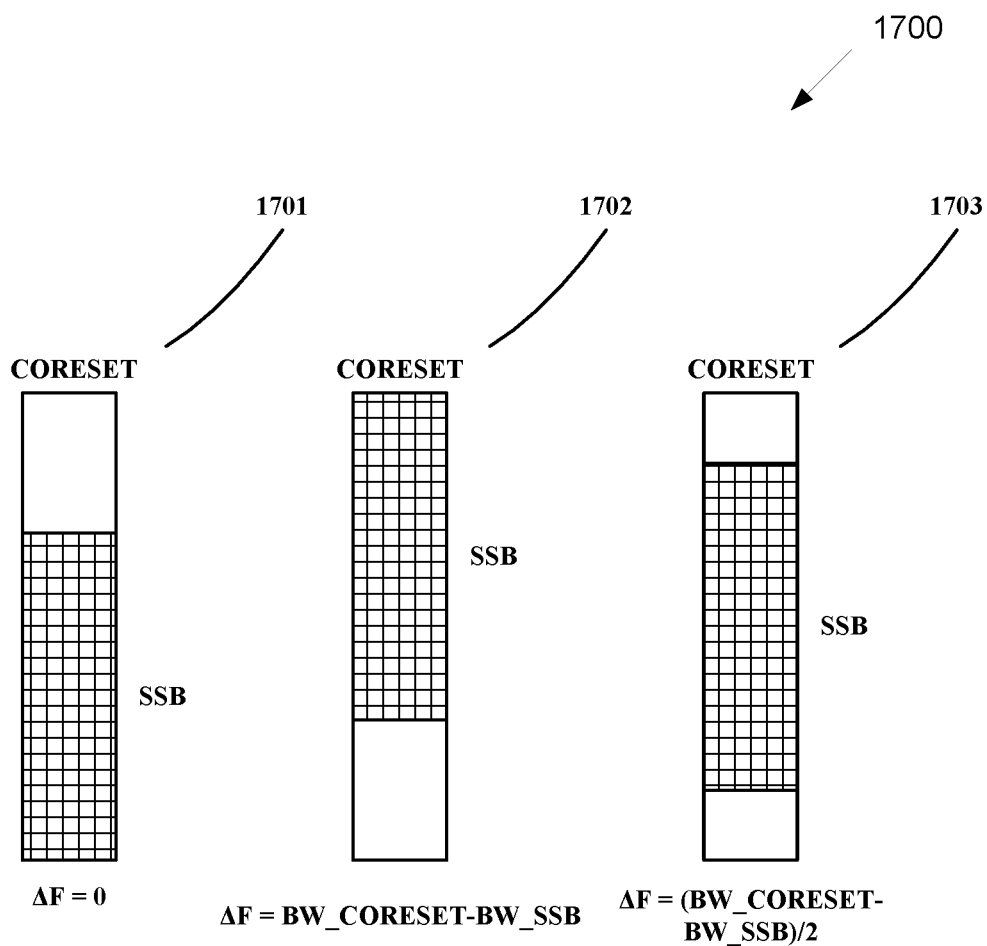
FIG. 17 illustrates an example fixed frequency offset according to embodiments of the present disclosure.

FIG. 17 illustrates an example fixed frequency offset 1700 according to embodiments of the present disclosure. An embodiment of the fixed frequency offset 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In one example, the RB level frequency offset ΔF is fixed for all supported nominal channels for a given band. For one instance, ΔF=0 for all supported nominal channels for a given band (e.g., SS/PBCH block and CORESET #0 are aligned at the lowest RE/RB), as illustrated in 1701 of FIG. 17.

In another example, ΔF=BW_CORESET−BW_SSB for all supported nominal channels for a given band (i.e., SS/PBCH block and CORESET #0 are aligned at the highest RE/RB), as illustrated in 1702 of FIG. 17.

In yet another example, ΔF=(BW_CORESET−BW_SSB)/2 for all supported nominal channels for a given band (i.e., SS/PBCH block and CORESET #0 are aligned at the center RE/RB), as illustrated in 1703 of FIG. 17. The fixed offset can be feasible due to the flexible relative location in frequency domain between SS/PBCH block and carrier bandwidth (e.g., floating SS/PBCH block within carrier bandwidth).

Figure 18A:
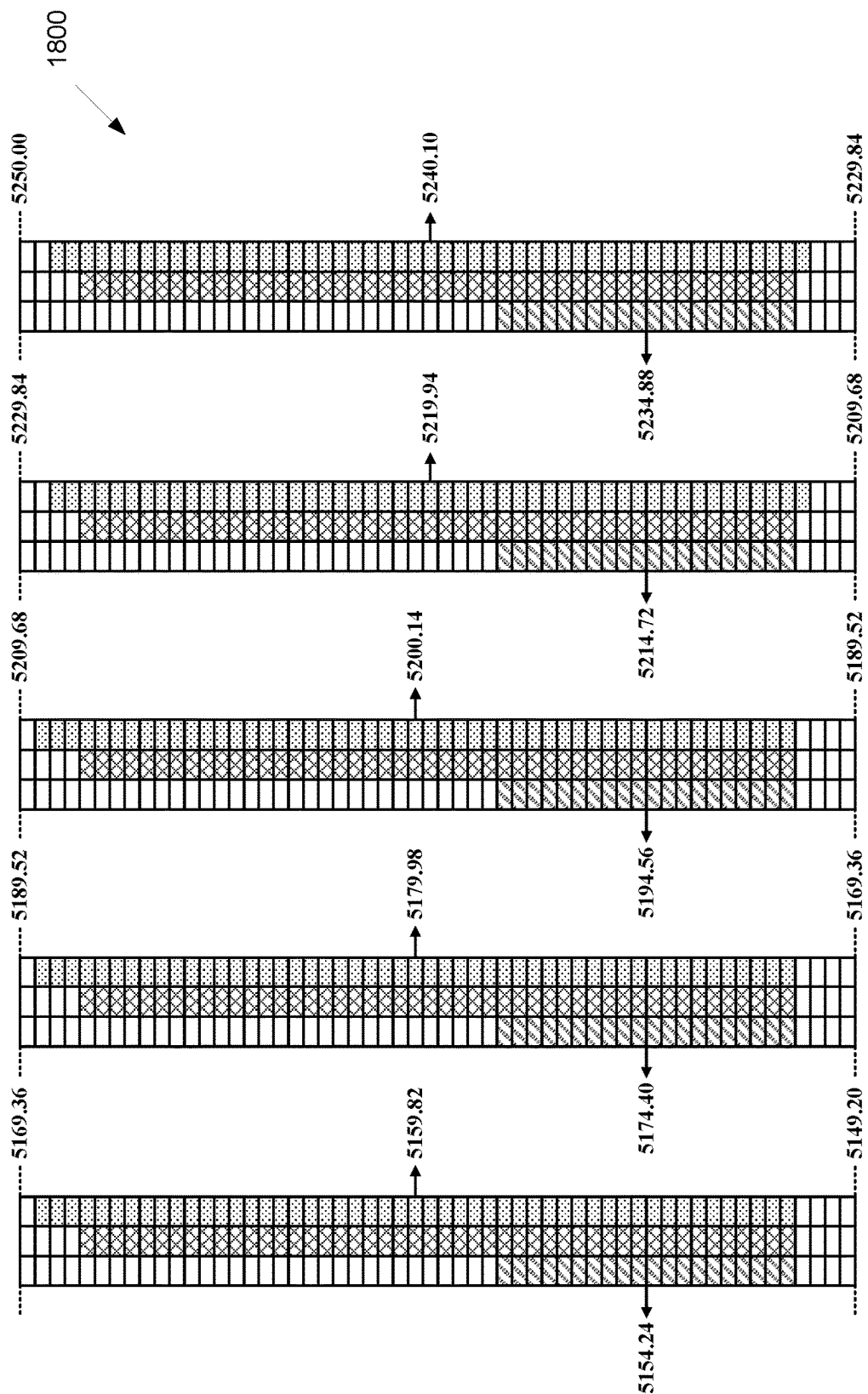
FIG. 18A illustrates an example RB level frequency offset for 5 GHz unlicensed spectrum according to embodiments of the present disclosure.

FIG. 18A illustrates an example RB level frequency offset 1800 for 5 GHz unlicensed spectrum according to embodiments of the present disclosure. An embodiment of the RB level frequency offset 1800 shown in FIG. 18A is for illustration only. One or more of the components illustrated in FIG. 18A can be implemented in specialized circuitry configured to perform the noted functions or one or more of the components can be implemented by one or more processors executing instructions to perform the noted functions. Other embodiments are used without departing from the scope of the present disclosure. Numbers in FIG. 18A are in the unit of MHz.

Figure 18B:
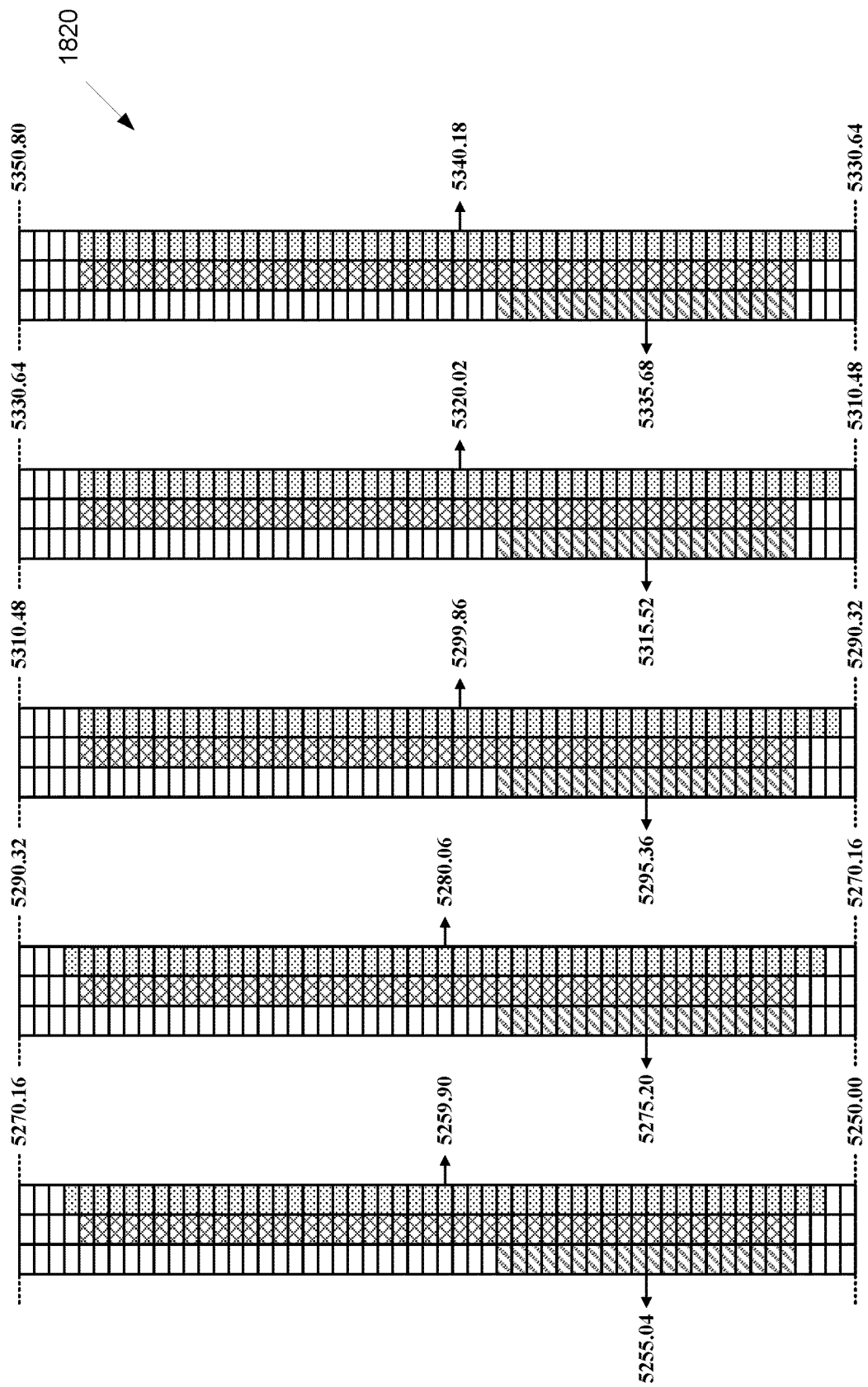
FIG. 18B illustrates an example RB level frequency offset for 5 GHz unlicensed spectrum according to embodiments of the present disclosure.

FIG. 18B illustrates an example RB level frequency offset 1820 for 5 GHz unlicensed spectrum according to embodiments of the present disclosure. An embodiment of the RB level frequency offset 1820 shown in FIG. 18B is for illustration only. One or more of the components illustrated in FIG. 18B can be implemented in specialized circuitry configured to perform the noted functions or one or more of the components can be implemented by one or more processors executing instructions to perform the noted functions. Other embodiments are used without departing from the scope of the present disclosure. Numbers in FIG. 18B are in the unit of MHz.

On instance for this example with ΔF2=0 is shown in FIGS. 18A and 18B (numbers in the figure are in the unit of MHz) and the corresponding configuration for part of the nominal channels defined for 5 GHz unlicensed spectrum is illustrated in TABLE 6. In this instance, every nominal channel has single synchronization raster entry, and the synchronization raster entries are down-selected from the NR GSCN values with a step size of 14.

Every nominal channel has single channel raster entry, and the set of all nominal channels are aligned with the same common resource grid using the common reference Point A. The interval (e.g., frequency distance) between neighboring channel raster entries may not be the same, such that single synchronization raster entry for each nominal channel is feasible by changing the relative frequency location between SS/PBCH block (as well as CORESET #0 since their relative frequency location is fixed) and the channel, as shown in FIGS. 18A and 18B. The guard band between neighboring channels may not be the same, as shown in FIGS. 18A and 18B.

TABLE 6

Example of configuration of RB level frequency offset for 5 GHz unlicensed spectrum

| Nominal Channel Index | g | f_c (MHz) | R_CH (MHz) | R_sync (MHz) | Corresponding GSCN | ΔF (30 kHz SCS RB) |
|---|---|---|---|---|---|---|
| 0 | 0 | 5160 | 5159.82 | 5154.24 | 8995 | 0 |
| 1 | 1 | 5180 | 5179.98 | 5174.40 | 9009 | 0 |
| 2 | 2 | 5200 | 5200.14 | 5194.56 | 9023 | 0 |
| 3 | 3 | 5220 | 5219.94 | 5214.72 | 9037 | 0 |
| 4 | 4 | 5240 | 5240.10 | 5234.88 | 9051 | 0 |
| 5 | 5 | 5260 | 5259.90 | 5255.04 | 9065 | 0 |
| 6 | 6 | 5280 | 5280.06 | 5275.20 | 9079 | 0 |
| 7 | 7 | 5300 | 5299.86 | 5295.36 | 9093 | 0 |
| 8 | 8 | 5320 | 5320.02 | 5315.52 | 9107 | 0 |
| 9 | 9 | 5340 | 5340.18 | 5335.68 | 9121 | 0 |

Figure 19A:
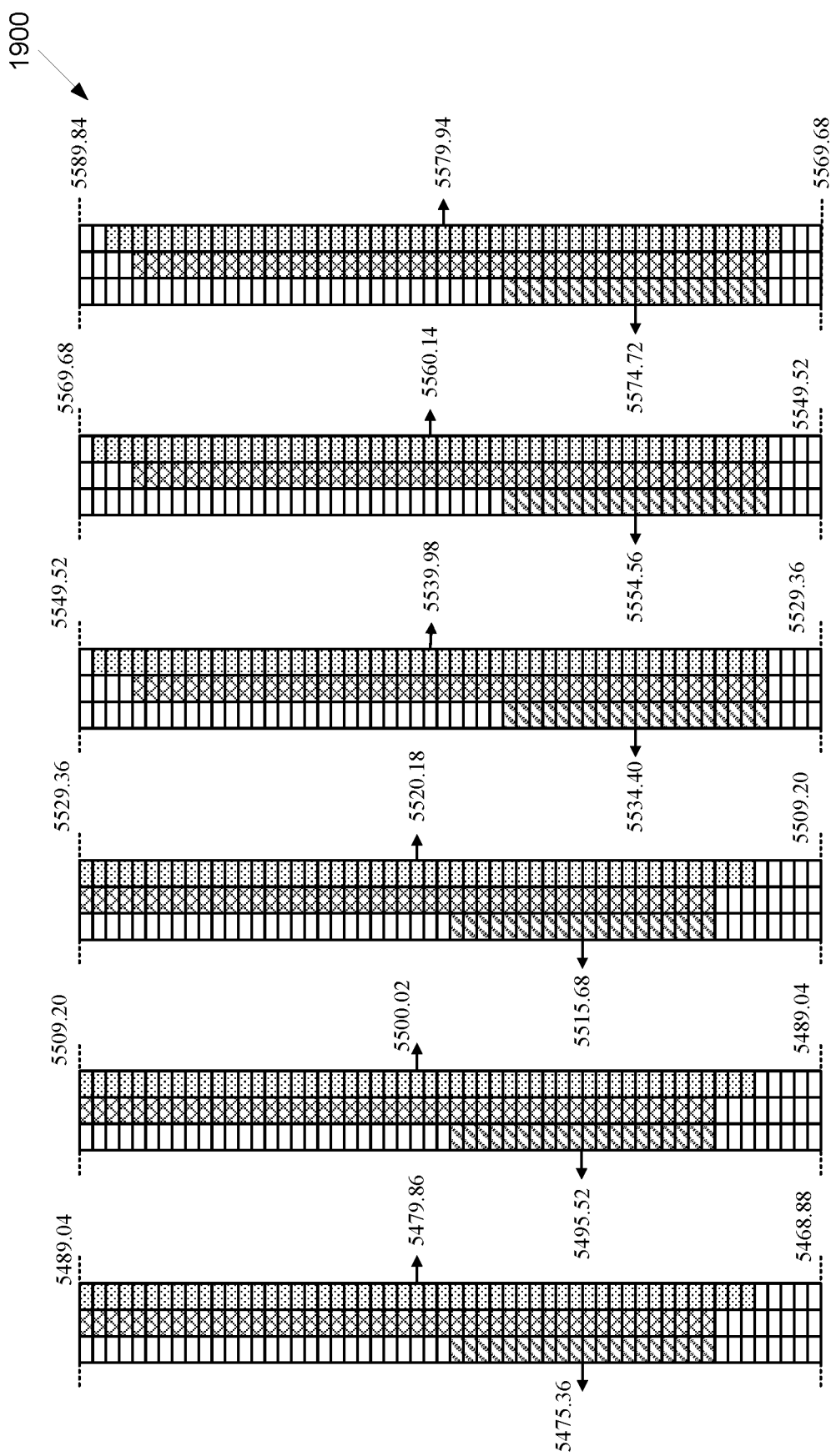
FIG. 19A illustrates another example RB level frequency offset for 5 GHz unlicensed spectrum according to embodiments of the present disclosure.

FIG. 19A illustrates another example RB level frequency offset 1900 for 5 GHz unlicensed spectrum according to embodiments of the present disclosure. An embodiment of the RB level frequency offset 1900 shown in FIG. 19A is for illustration only. One or more of the components illustrated in FIG. 19A can be implemented in specialized circuitry configured to perform the noted functions or one or more of the components can be implemented by one or more processors executing instructions to perform the noted functions. Other embodiments are used without departing from the scope of the present disclosure. Numbers in FIG. 19A are in the unit of MHz.

Figure 19B:
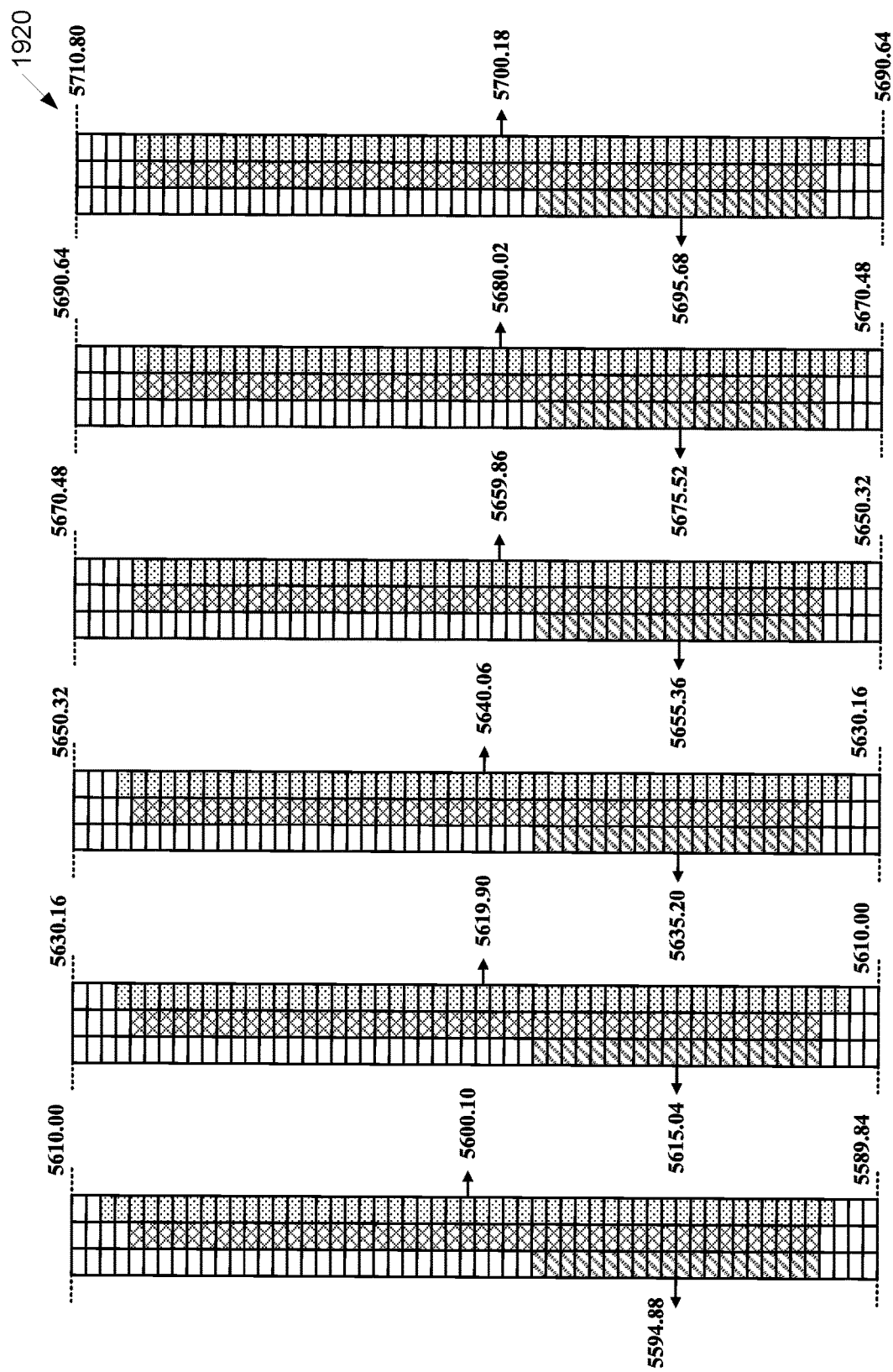
FIG. 19B illustrates another example RB level frequency offset for 5 GHz unlicensed spectrum according to embodiments of the present disclosure.

FIG. 19B illustrates another example RB level frequency offset 1920 for 5 GHz unlicensed spectrum according to embodiments of the present disclosure. An embodiment of the RB level frequency offset 1920 shown in FIG. 19B is for illustration only. One or more of the components illustrated in FIG. 19B can be implemented in specialized circuitry configured to perform the noted functions or one or more of the components can be implemented by one or more processors executing instructions to perform the noted functions. Other embodiments are used without departing from the scope of the present disclosure. Numbers in FIG. 19B are in the unit of MHz.

Another instance for this example with ΔF2=0 for another part of the nominal channels defined for 5 GHz unlicensed spectrum is illustrated in TABLE 7. In this instance, every nominal channel has single synchronization raster entry, and the synchronization raster entries are down-selected from the NR GSCN values with a step size of 14 or 13.

Every nominal channel has single channel raster entry, and the set of all nominal channels are aligned with the same common resource grid using the common reference Point A. The interval (e.g., frequency distance) between neighboring channel raster entries may not be the same, such that single synchronization raster entry for each nominal channel is feasible by changing the relative frequency location between SS/PBCH block (as well as CORESET #0 since their relative frequency location is fixed) and the channel, and the guard band between neighboring channels may not be the same, as illustrated in FIGS. 19A and 19B.

TABLE 7

Example of configuration of RB level frequency offset for 5 GHz unlicensed spectrum

| Nominal Channel Index | g | f_c (MHz) | R_CH (MHz) | R_sync (MHz) | Corresponding GSCN | ΔF (30 kHz SCS RB) |
|---|---|---|---|---|---|---|
| 10 | 16 | 5480 | 5479.86 | 5475.36 | 9218 | 0 |
| 11 | 17 | 5500 | 5500.02 | 5495.52 | 9232 | 0 |
| 12 | 18 | 5520 | 5520.18 | 5515.68 | 9246 | 0 |
| 13 | 19 | 5540 | 5539.98 | 5534.40 | 9259 | 0 |
| 14 | 20 | 5560 | 5560.14 | 5554.56 | 9273 | 0 |
| 15 | 21 | 5580 | 5579.94 | 5574.72 | 9287 | 0 |
| 16 | 22 | 5600 | 5600.10 | 5594.88 | 9301 | 0 |
| 17 | 23 | 5620 | 5619.90 | 5615.04 | 9315 | 0 |
| 18 | 24 | 5640 | 5640.06 | 5635.20 | 9329 | 0 |
| 19 | 25 | 5660 | 5659.86 | 5655.36 | 9343 | 0 |
| 20 | 26 | 5680 | 5680.02 | 5675.52 | 9357 | 0 |
| 21 | 27 | 5700 | 5700.18 | 5695.68 | 9371 | 0 |

Yet another instance for this example with ΔF2=14 for part of the nominal channels defined for 5 GHz unlicensed spectrum is illustrated in TABLE 8. In this instance, every nominal channel has single synchronization raster entry, and the synchronization raster entries are down-selected from the NR GSCN values with a step size of 14 or 13. Every nominal channel has single channel raster entry, and the set of all nominal channels are aligned with the same common resource grid using the common reference Point A.

The interval (e.g. frequency distance) between neighboring channel raster entries may not be the same, such that single synchronization raster entry for each nominal channel is feasible by changing the relative frequency location between SS/PBCH block (as well as CORESET #0 since their relative frequency location is fixed) and the channel, and the guard band between neighboring channels may not be the same.

TABLE 8

Example of configuration of RB level frequency offset for 5 GHz unlicensed spectrum

| Nominal Channel Index | g | f_c (MHz) | R_CH (MHz) | R_sync (MHz) | Corresponding GSCN | ΔF (30 kHz SCS RB) |
|---|---|---|---|---|---|---|
| 0 | 0 | 5160 | 5160.18 | 5160.00 | 8999 | 14 |
| 1 | 1 | 5180 | 5179.98 | 5180.16 | 9013 | 14 |
| 2 | 2 | 5200 | 5200.14 | 5200.32 | 9027 | 14 |
| 3 | 3 | 5220 | 5219.94 | 5220.48 | 9041 | 14 |
| 4 | 4 | 5240 | 5240.10 | 5240.64 | 9055 | 14 |
| 5 | 5 | 5260 | 5259.90 | 5259.36 | 9068 | 14 |
| 6 | 6 | 5280 | 5280.06 | 5279.52 | 9082 | 14 |
| 7 | 7 | 5300 | 5299.86 | 5299.68 | 9096 | 14 |
| 8 | 8 | 5320 | 5320.02 | 5319.84 | 9110 | 14 |
| 9 | 9 | 5340 | 5340.18 | 5340.00 | 9124 | 14 |

Yet another instance for this example with ΔF2=14 for another part of the nominal channels defined for 5 GHz unlicensed spectrum is illustrated in TABLE 9. In this instance, every nominal channel has single synchronization raster entry, and the synchronization raster entries are down-selected from the NR GSCN values with a step size of 14 or 13. Every nominal channel has single channel raster entry, and the set of all nominal channels are aligned with the same common resource grid using the common reference Point A.

The interval (e.g., frequency distance) between neighboring channel raster entries may not be the same, such that single synchronization raster entry for each nominal channel is feasible by changing the relative frequency location between SS/PBCH block (as well as CORESET #0 since their relative frequency location is fixed) and the channel, and the guard band between neighboring channels may not be the same.

TABLE 9

Example of configuration of RB level frequency offset for 5 GHz unlicensed spectrum

| Nominal Channel Index | G | f_c (MHz) | R_CH (MHz) | R_sync (MHz) | Corresponding GSCN | ΔF (30 kHz SCS RB) |
|---|---|---|---|---|---|---|
| 20 | 16 | 5480 | 5479.86 | 5479.68 | 9221 | 14 |
| 11 | 17 | 5500 | 5500.02 | 5499.84 | 9235 | 14 |
| 12 | 18 | 5520 | 5520.18 | 5520.00 | 9249 | 14 |
| 13 | 19 | 5540 | 5539.98 | 5540.16 | 9263 | 14 |
| 14 | 20 | 5560 | 5560.14 | 5560.32 | 9277 | 14 |
| 15 | 21 | 5580 | 5579.94 | 5580.48 | 9291 | 14 |
| 16 | 22 | 5600 | 5600.10 | 5600.64 | 9305 | 14 |
| 17 | 23 | 5620 | 5619.90 | 5619.36 | 9318 | 14 |
| 18 | 24 | 5640 | 5640.06 | 5639.52 | 9332 | 14 |
| 19 | 25 | 5660 | 5659.86 | 5659.68 | 9346 | 14 |
| 20 | 26 | 5680 | 5680.02 | 5679.84 | 9360 | 14 |
| 21 | 27 | 5700 | 5700.18 | 5700.00 | 9374 | 14 |

In another example of this approach, the RB level frequency offset ΔF is fixed, but it can take different value based on nominal channel index for a given band. If there is single synchronization raster entry supported for every nominal carrier, this example is equivalent to supporting a fixed RB level frequency offset, wherein the RB offset is associated to a synchronization raster entry.

A UE could acquire the fixed RB level frequency offset based on the identified synchronization raster entry. For one instance, ΔF is one of 0 or 1 or 2 for a given nominal carrier on a given band. For another instance, ΔF is one of BW_CORESET−BW_SSB, or BW_CORESET−BW_SSB+1, or BW_CORESET−BW_SSB+2 for a given nominal carrier on a given band. For yet another instance, ΔF is one of (BW_CORESET−BW_SSB)/2, or (BW_CORESET−BW_SSB)/2+1, or (BW_CORESET−BW_SSB)/2+2 for a given nominal carrier on a given band.

In one example, there could be not unique channel raster entry value corresponding the single synchronization raster entry for a given nominal carrier, wherein the channels corresponding to the channel raster entries are on the same common resource grid, and the channel raster entries are complied with the regulation requirement. In one aspect of this consideration, the regulation requirement allows +/−200 kHz shift from the predefined center frequency, which is larger than 1 RB in term of the SCS of common resource grid (e.g. 360 kHz in 30 kHz SCS), hence, if a channel is located on the edge of the +/−200 kHz shift range (e.g. +/−160 to 200 kHz), it may be possible to implement the channel in another location within the +/−200 kHz shift range with 360 kHz away.

For one instance, in TABLE 8, for nominal channel index as 0 (e.g., g=0) and f_c=5160 MHz, the channel raster could also be R_CH=5159.82 MHz, with the same synchronization raster entry R_sync and frequency offset ΔF as in TABLES. For another instance, in TABLE 8, for nominal channel index as 9 (e.g., g=9) and f_c=5340 MHz, the channel raster could also be R_CH=5339.82 MHz, with the same synchronization raster entry R_sync and frequency offset ΔF as in TABLES.

For yet another instance, in TABLE 9, for nominal channel index as 12 (e.g., g=18) and f_c=5520 MHz, the channel raster could also be R_CH=5519.82 MHz, with the same synchronization raster entry R_sync and frequency offset ΔF as in TABLES. For yet another instance, in TABLE 9, for nominal channel index as 21 (e.g., g=27) and f_c=5700 MHz, the channel raster could also be R_CH=5699.82 MHz, with the same synchronization raster entry R_sync and frequency offset ΔF as in TABLE 9.

In another example there could be RE level offset indicated to the UE, in addition to the RB level offset (e.g., the RE level offset is not fixed as 0), in order to allow some flexibility on channelization. For this consideration, the RB level offset can be using the same examples of this approach, and there is a separate indication of RE level offset, wherein the indication method could follow the examples of other approaches in this disclosure.

In one embodiment, a frequency offset is defined as the difference between lowest RE of the SS/PBCH block and the lowest RE of a bandwidth part (BWP).

In one example, the BWP can be the active initial DL BWP, which can be defined by the CORESET #0 for common search space for monitoring a Type0-PDCCH (e.g., at least one of RMSI, broadcast OSI, paging, or RAR). In this example, the approaches in the first embodiment can be applicable here.

In another example, the BWP can be a general BWP, and the BWP is confined within a nominal channel bandwidth. Then, by replacing CORESET BW to BWP BW, and CORESET SCS to BWP SCS, the approaches in the first embodiment can be applicable here.

In yet another example, the BWP can be a general BWP, and the BWP can exceed a nominal channel bandwidth. Then, by replacing CORESET BW to BWP BW, and CORESET SCS to BWP SCS, and denote CH BW as the total bandwidth of the carrier containing the BWP, the approaches in the first embodiment can be applicable here.

In one embodiment, the frequency offset is defined as the difference between lowest RE of the SS/PBCH block and the lowest RE of a targeting channel.

In one example, the targeting channel can be the nominal channel containing the SS/PBCH block.

In such embodiment, denote BW_CH as the BW of the targeting channel, BW_SSB as the BW of SS/PBCH block, SCS_CH as the SCS of the targeting channel, and SCS_SSB as the SCS of SS/PBCH block.

In one example, the frequency offset can be determined by an RB level frequency offset ΔF2 and a RE level frequency offset ΔF1, wherein the RB and RE are expressed in SCS_CH. For this approach, each of the channel rasters supported for the targeting channel can be expressed as R_ref−Δ, wherein R_ref is a reference frequency location that the corresponding resource block grid of the channel located on R_ref is aligned with the resource block grid of SS/PBCH block located on a synchronization raster, and Δ≥0. The set of all R_ref for the channel rasters supported for a channel can be denoted as S_ref.

In one example, the SS/PBCH block can be confined within the targeting channel (e.g., a nominal channel), and the SS/PBCH block can locate on one common synchronization raster such that the SS/PBCH block is confined within the BW of the targeting CH wherein the targeting CH can be located at any channel rasters supported. For each R_ref for the targeting channel, a configuration of ΔF2 required, such that the number of configurations of ΔF2 is at least the same as the number of reference frequency locations in S_ref (e.g., set size of S_ref), e.g., each configuration corresponds to a value of R_ref, and the configuration can be given by R_sync−R_ref+BW_CH/2−BW_SSB*SCS_SSB/SCS_CH/2.

Figure 20:
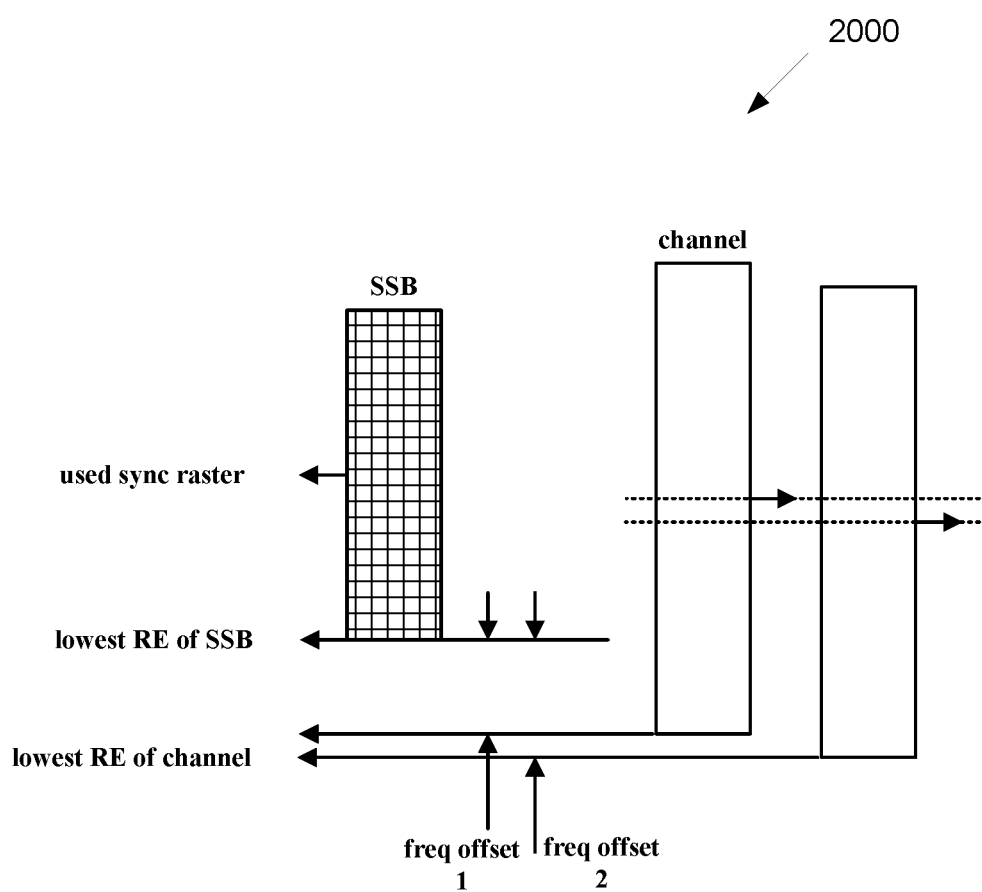
FIG. 20 illustrates example frequency offset indication according to embodiments of the present disclosure.

FIG. 20 illustrates example frequency offset indication 2000 according to embodiments of the present disclosure. An embodiment of the frequency offset indication 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In one example, the SS/PBCH block can be not confined within the targeting channel (e.g. a nominal channel), and the SS/PBCH block can locate on one common synchronization raster such that the SS/PBCH block may not be confined within the BW of the targeting CH wherein the targeting CH can be located at any channel rasters supported. For each R_ref for the targeting channel, a configuration of ΔF2 required, such that the number of configurations of ΔF2 is at least the same as the number of reference frequency locations in S_ref (e.g. set size of S_ref), e.g. each configuration corresponds to a value of R_ref, and the configuration can be given by R_sync-R_ref+BW_CH/2−BW_SSB*SCS_SSB/SCS_CH/2.

In one example, the frequency offset can be determined by an RB level frequency offset ΔF, and there is no RE level frequency offset allowed, wherein for example the RB is expressed in a predefined SCS or could also be configured associated with the frequency offset.

Figure 21:
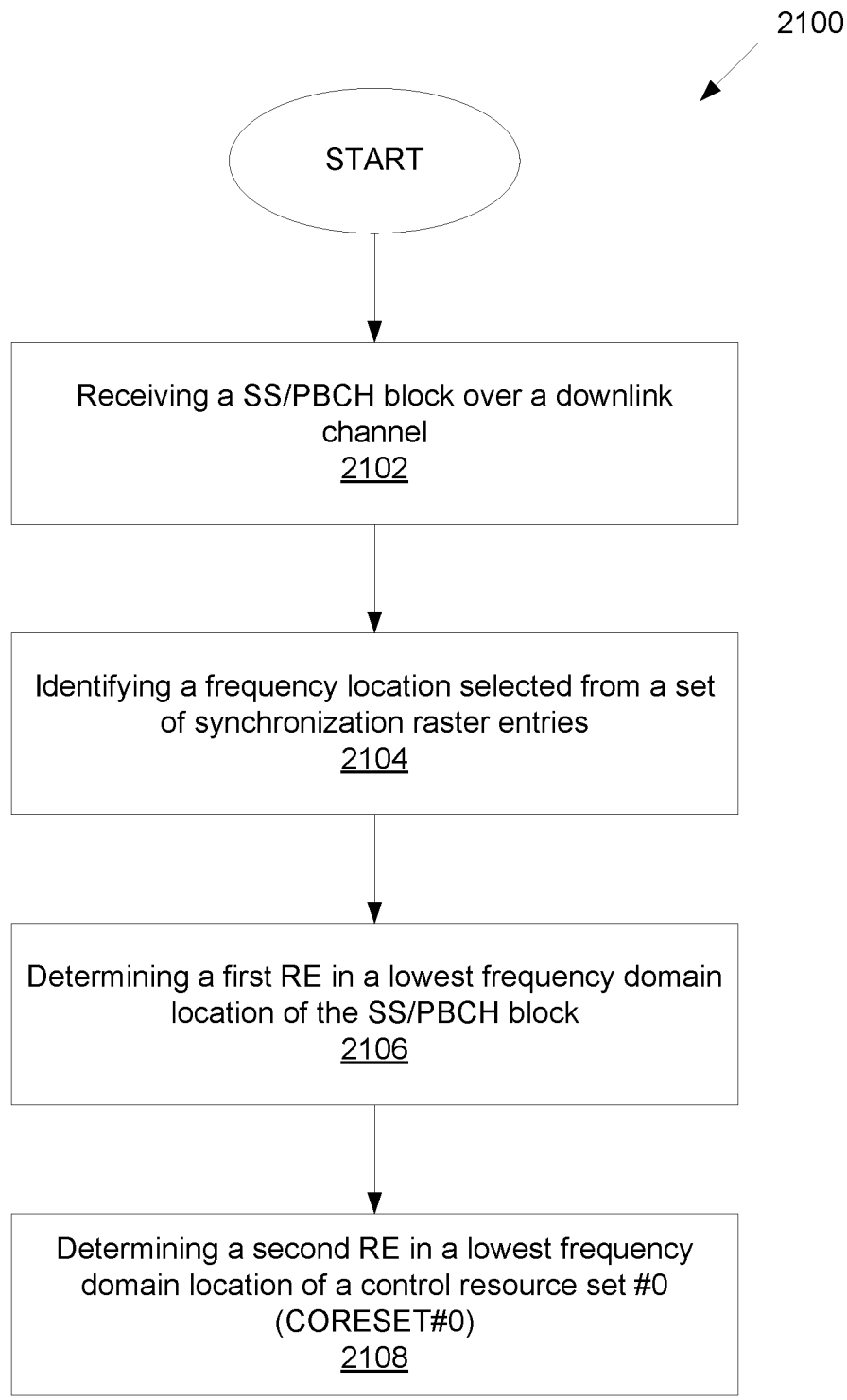
FIG. 21 illustrates a flowchart of a method for a frequency offset indication according to embodiments of the present disclosure.

FIG. 21 illustrates a flowchart of a method 2100 for a frequency offset indication according to embodiments of the present disclosure, as may be performed by a user equipment (UE) (e.g., 111-116 as illustrated in FIG. 1). An embodiment of the method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 21, the method 2100 begins at step 2102. In step 2102, a UE receives, from a base station (BS), a synchronization signal and physical broadcast channel block (SS/PBCH block) over a downlink channel of an unlicensed band.

Next, in step 2104, the UE identifies a frequency location selected from a set of synchronization raster entries for receiving the SS/PBCH block, wherein the frequency location is aligned with a center resource element (RE) of the SS/PBCH block.

In one embodiment, the set of synchronization raster entries include one synchronization raster entry for each nominal channel with a bandwidth of 20 MHz on the unlicensed band, the synchronization raster entry corresponding to a global synchronization channel number (GSCN) value.

In one embodiment, wherein the set of synchronization raster entries includes non-uniform intervals between neighboring synchronization raster entries, the non-uniform intervals determined from 13 or 14 GSCN values.

In one embodiment, the UE identifies a set of frequency locations each of which is aligned with a center frequency of a nominal channel with a bandwidth of 20 MHz on the unlicensed band, and wherein the set of frequency locations is further aligned with a same common resource block grid based on a subcarrier spacing of 30 kHz.

In one embodiment, the set of frequency locations includes non-uniform intervals between neighboring frequency locations, the non-uniform intervals determined from 55 RBs or 56 RBs based on a subcarrier spacing of 30 kHz.

Subsequently, in step 2106, the UE determines a first RE in a first lowest frequency domain location of the SS/PBCH block based on the identified frequency location.

Finally, in step 2108, the UE determines a second RE in a second lowest frequency domain location of a control resource set #0 (CORESET #0) that includes a fixed frequency offset between the first RE of the SS/PBCH block and the second RE of the CORESET #0.

In one embodiment, the fixed frequency offset is determined as 0 resource block (RB) based on a subcarrier spacing of 30 kHz.

In one embodiment, wherein 0 RB, for the fixed frequency offset between the first RE of the SS/PBCH block and the second RE of the CORESET #0 based on the subcarrier spacing of 30 kHz, is determined such that: for a nominal channel with center frequency as 5160 MHz, a synchronization raster entry is 5154.24 MHz, which corresponds to a GSCN value of 8995; for a nominal channel with center frequency as 5180 MHz, a synchronization raster entry is 5174.40 MHz, which corresponds to a GSCN value of 9009; for a nominal channel with center frequency as 5200 MHz, a synchronization raster entry is 5194.56 MHz, which corresponds to a GSCN value of 9023; for a nominal channel with center frequency as 5220 MHz, a synchronization raster entry is 5214.72 MHz, which corresponds to a GSCN value of 9037; for a nominal channel with center frequency as 5240 MHz, a synchronization raster entry is 5234.88 MHz, which corresponds to a GSCN value of 9051; for a nominal channel with center frequency as 5260 MHz, a synchronization raster entry is 5255.04 MHz, which corresponds to a GSCN value of 9065; for a nominal channel with center frequency as 5280 MHz, a synchronization raster entry is 5175.20 MHz, which corresponds to a GSCN value of 9079; for a nominal channel with center frequency as 5300 MHz, a synchronization raster entry is 5295.36 MHz, which corresponds to a GSCN value of 9093; for a nominal channel with center frequency as 5320 MHz, a synchronization raster entry is 5315.52 MHz, which corresponds to a GSCN value of 9107; and for a nominal channel with center frequency as 5340 MHz, a synchronization raster entry is 5335.68 MHz, which corresponds to a GSCN value of 9121.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
 a transceiver configured to receive, from a base station (BS), a synchronization signal and physical broadcast channel block (SS/PBCH block) over a downlink channel of an unlicensed band; and at least one processor operably connected to the transceiver, the at least one processor configured to identify a frequency location for receiving the SS/PBCH block based on a set of synchronization raster entries, wherein the set of synchronization raster entries include one synchronization raster entry for each nominal channel with a bandwidth of 20 MHz on the unlicensed band, the synchronization raster entry corresponding to a global synchronization channel number (GSCN) value, and wherein the set of synchronization raster entries includes non-uniform intervals between neighboring synchronization raster entries.

2. The UE of claim 1, wherein a guard band between a nominal channel and a neighboring nominal channel adjacent to a nominal channel corresponds to an integer multiple of resource blocks with respect to a subcarrier spacing of a common resource grid.

3. The UE of claim 2, wherein the guard band is a different value from another guard band.

4. The UE of claim 3, wherein:
a subcarrier spacing of the SS/PBCH block is 30 kHz,
a value of the synchronization raster entry corresponding to a GSCN value of 9051 is 5234.88 MHz,
a value of the synchronization raster entry corresponding to a GSCN value of 9065 is 5255.04 MHz,
a value of the synchronization raster entry corresponding to a GSCN value of 9079 is 5175.20 MHz,
a value of the synchronization raster entry corresponding to a GSCN value of 9093 is 5255.04 MHz,
a value of the synchronization raster entry corresponding to a GSCN value of 9107 is 5315.52 MHz, and
a value of the synchronization raster entry corresponding to a GSCN value of 9121 is 5335.68 MHz.

5. The UE of claim 1, wherein the non-uniform intervals are determined from 13 or 14 GSCN values.

6. The UE of claim 1, wherein:
a subcarrier spacing (SCS) of the SS/PBCH block is 30 KHz,
a value of the synchronization raster entry corresponding to a GSCN value of 9218 is 5475.36 MHz,
a value of the synchronization raster entry corresponding to a GSCN value of 9232 is 5495.52 MHz,
a value of the synchronization raster entry corresponding to a GSCN value of 9246 is 5515.68 MHz,
a value of the synchronization raster entry corresponding to a GSCN value of 9301 is 5594.88 MHz,
a value of the synchronization raster entry corresponding to a GSCN value of 9315 is 5615.04 MHz,
a value of the synchronization raster entry corresponding to a GSCN value of 9329 is 5635.20 MHz,
a value of the synchronization raster entry corresponding to a GSCN value of 9343 is 5655.36 MHz,
a value of the synchronization raster entry corresponding to a GSCN value of 9357 is 5675.52 MHz, and
a value of the synchronization raster entry corresponding to a GSCN value of 9371 is 5695.68 MHz.

7. A base station (BS) in a wireless communication system, the BS comprising:
at least one processor configured to identify a frequency location for transmitting a synchronization signal and physical broadcast channel block (SS/PBCH block) based on a set of synchronization raster entries; and
a transceiver operably connected to the at least on processor, the transceiver configured to transmit, to a user equipment (UE), the SS/PBCH block over a downlink channel of an unlicensed band, wherein the set of synchronization raster entries include one synchronization raster entry for each nominal channel with a bandwidth of 20 MHz on the unlicensed band, the synchronization raster entry corresponding to a global synchronization channel number (GSCN) value, and wherein the set of synchronization raster entries includes non-uniform intervals between neighboring synchronization raster entries.

8. The BS of claim 7, wherein a guard band between a nominal channel and a neighboring nominal channel adjacent to a nominal channel corresponds to an integer multiple of resource blocks with respect to a subcarrier spacing of a common resource grid.

9. The BS of claim 8, wherein the guard band is a different value from another guard band.

10. The BS of claim 9, wherein:
a subcarrier spacing of the SS/PBCH block is 30 kHz,
a value of the synchronization raster entry corresponding to a GSCN value of 9051 is 5234.88 MHz,
a value of the synchronization raster entry corresponding to a GSCN value of 9065 is 5255.04 MHz,
a value of the synchronization raster entry corresponding to a GSCN value of 9079 is 5175.20 MHz,
a value of the synchronization raster entry corresponding to a GSCN value of 9093 is 5255.04 MHz,
a value of the synchronization raster entry corresponding to a GSCN value of 9107 is 5315.52 MHz, and
a value of the synchronization raster entry corresponding to a GSCN value of 9121 is 5335.68 MHz.

11. The BS of claim 7, wherein the non-uniform intervals are determined from 13 or 14 GSCN values.

12. The BS of claim 7, wherein:
a subcarrier spacing (SCS) of the SS/PBCH block is 30 KHz,
a value of the synchronization raster entry corresponding to a GSCN value of 9218 is 5475.36 MHz,
a value of the synchronization raster entry corresponding to a GSCN value of 9232 is 5495.52 MHz,
a value of the synchronization raster entry corresponding to a GSCN value of 9246 is 5515.68 MHz,
a value of the synchronization raster entry corresponding to a GSCN value of 9301 is 5594.88 MHz,
a value of the synchronization raster entry corresponding to a GSCN value of 9315 is 5615.04 MHz,
a value of the synchronization raster entry corresponding to a GSCN value of 9329 is 5635.20 MHz,
a value of the synchronization raster entry corresponding to a GSCN value of 9343 is 5655.36 MHz,
a value of the synchronization raster entry corresponding to a GSCN value of 9357 is 5675.52 MHz, and
a value of the synchronization raster entry corresponding to a GSCN value of 9371 is 5695.68 MHz.

13. A method of a user equipment (UE) in a wireless communication system, the method comprising:
receiving, from a base station (BS), a synchronization signal and physical broadcast channel block (SS/PBCH block) over a downlink channel of an unlicensed band; and
identifying a frequency location for receiving the SS/PBCH block based on a set of synchronization raster entries,
wherein the set of synchronization raster entries include one synchronization raster entry for each nominal channel with a bandwidth of 20 MHz on the unlicensed band, the synchronization raster entry corresponding to a global synchronization channel number (GSCN) value, and wherein the set of synchronization raster entries includes non-uniform intervals between neighboring synchronization raster entries.

14. The method of claim 13, wherein a guard band between a nominal channel and a neighboring nominal channel adjacent to the nominal channel corresponds to an integer multiple of resource blocks with respect to a subcarrier spacing of a common resource grid.

15. The method of claim 14, wherein the guard band is a different value from another guard band.

16. The method of claim 15, wherein:
a subcarrier spacing of the SS/PBCH block is 30 kHz,
a value of the synchronization raster entry corresponding to a GSCN value of 9051 is 5234.88 MHz,
a value of the synchronization raster entry corresponding to a GSCN value of 9065 is 5255.04 MHz,
a value of the synchronization raster entry corresponding to a GSCN value of 9079 is 5175.20 MHz,
a value of the synchronization raster entry corresponding to a GSCN value of 9093 is 5255.04 MHz,
a value of the synchronization raster entry corresponding to a GSCN value of 9107 is 5315.52 MHz,
a value of the synchronization raster entry corresponding to a GSCN value of 9121 is 5335.68 MHz.

17. The method of claim 13, wherein the non-uniform intervals are determined from 13 or 14 GSCN values.

18. The method of claim 13, wherein:
a subcarrier spacing (SCS) of the SS/PBCH block is 30 KHz,
a value of the synchronization raster entry corresponding to a GSCN value of 9218 is 5475.36 MHz,
a value of the synchronization raster entry corresponding to a GSCN value of 9232 is 5495.52 MHz,
a value of the synchronization raster entry corresponding to a GSCN value of 9246 is 5515.68 MHz,
a value of the synchronization raster entry corresponding to a GSCN value of 9301 is 5594.88 MHz,
a value of the synchronization raster entry corresponding to a GSCN value of 9315 is 5615.04 MHz,
a value of the synchronization raster entry corresponding to a GSCN value of 9329 is 5635.20 MHz,
a value of the synchronization raster entry corresponding to a GSCN value of 9343 is 5655.36 MHz,
a value of the synchronization raster entry corresponding to a GSCN value of 9357 is 5675.52 MHz, and
a value of the synchronization raster entry corresponding to a GSCN value of 9371 is 5695.68 MHz.

* * * * *